United States Patent
Dickson et al.

(10) Patent No.: US 9,684,629 B2
(45) Date of Patent: Jun. 20, 2017

(54) EFFICIENT CALIBRATION OF A LOW POWER PARALLEL DATA COMMUNICATIONS CHANNEL

(71) Applicant: International Business Machines Corporation, Armonk, NY (US)

(72) Inventors: Timothy O. Dickson, Danbury, CT (US); Daniel M. Dreps, Georgetown, TX (US); Frank D. Ferraiolo, Naples, FL (US); Douglas J. Joseph, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/138,210

(22) Filed: Apr. 25, 2016

(65) Prior Publication Data

US 2016/0239459 A1    Aug. 18, 2016

Related U.S. Application Data

(63) Continuation of application No. 13/561,446, filed on Jul. 30, 2012.

(51) Int. Cl.
*G06F 9/00* (2006.01)
*G06F 13/00* (2006.01)
(Continued)

(52) U.S. Cl.
CPC .......... *G06F 15/17318* (2013.01); *G06F 9/00* (2013.01); *G06F 11/3058* (2013.01);
(Continued)

(58) Field of Classification Search
CPC .......... G06F 13/00; G06F 19/00; H04L 12/56; H04B 1/38
See application file for complete search history.

(56) References Cited

U.S. PATENT DOCUMENTS

| 4,332,028 A | 5/1982 | Joccotton et al. |
| 4,656,592 A | 4/1987 | Spaanenburg et al. |

(Continued)

FOREIGN PATENT DOCUMENTS

| JP | 9161498 A | 6/1997 |
| JP | 2000090690 A | 3/2000 |

OTHER PUBLICATIONS

"Continuous Time, Interface Calibration for a High-Speed Interface—Dynamic Data Centering", published anonymously in ip.com, Document No. IPCOM000196832D, Jun. 17, 2010.

(Continued)

*Primary Examiner* — Henry Tsai
*Assistant Examiner* — Christopher A Daley
(74) *Attorney, Agent, or Firm* — Roy W. Truelson

(57) ABSTRACT

A calibratable communications link includes multiple parallel lines. Calibration is performed at dynamically variable and/or interruptible intervals determined by an automated mechanism. Calibration is preferably initiated responsive to a command generated by an executable software process, which initiates calibration responsive to detection of a probable impending need as indicated by, e.g., temperature change, calibrated parameter drift, error rate, etc. Calibration is also preferably initiated according to probable minimal disruption of device function, as indicated by low activity level. Furthermore, in one aspect calibration may be temporarily suspended to transmit data and then resumed.

15 Claims, 13 Drawing Sheets

(51) Int. Cl.

| | | |
|---|---|---|
| *G06F 15/173* | (2006.01) | |
| *G06F 13/42* | (2006.01) | |
| *G06F 11/30* | (2006.01) | |
| *G06F 13/16* | (2006.01) | |
| *G06F 13/24* | (2006.01) | |
| *G06F 15/80* | (2006.01) | |
| *G06F 19/00* | (2011.01) | |
| *H04B 1/38* | (2015.01) | |
| *H04L 12/54* | (2013.01) | |

(52) U.S. Cl.
CPC .......... *G06F 13/00* (2013.01); *G06F 13/1673* (2013.01); *G06F 13/24* (2013.01); *G06F 13/4217* (2013.01); *G06F 13/4282* (2013.01); *G06F 15/803* (2013.01); *G06F 19/00* (2013.01); *H04B 1/38* (2013.01); *H04L 12/56* (2013.01); *Y02B 60/1228* (2013.01); *Y02B 60/1235* (2013.01)

(56) References Cited

U.S. PATENT DOCUMENTS

| | | | |
|---|---|---|---|
| 4,964,120 A | 10/1990 | Mostashari | |
| 5,359,561 A | 10/1994 | Sakomura et al. | |
| 5,577,096 A | 11/1996 | Kitano et al. | |
| 5,715,274 A | 2/1998 | Rostoker et al. | |
| 5,734,844 A | 3/1998 | Moughanni et al. | |
| 6,101,151 A | 8/2000 | Watanabe et al. | |
| 6,240,087 B1 | 5/2001 | Cummings et al. | |
| 6,556,660 B1 | 4/2003 | Li et al. | |
| 6,606,576 B2* | 8/2003 | Sessions | G06F 13/423 |
| | | | 702/107 |
| 6,650,649 B1 | 11/2003 | Muhammad et al. | |
| 6,735,543 B2 | 5/2004 | Douskey et al. | |
| 6,771,568 B2 | 8/2004 | Hochendoner | |
| 7,072,355 B2* | 7/2006 | Kizer | H03M 9/00 |
| | | | 370/250 |
| 7,117,126 B2 | 10/2006 | Floyd et al. | |
| 7,142,640 B2 | 11/2006 | Beltz et al. | |
| 7,159,136 B2* | 1/2007 | Best | G11C 29/02 |
| | | | 713/401 |
| 7,305,574 B2 | 12/2007 | Ferraiolo et al. | |
| 7,400,670 B2* | 7/2008 | Hampel | H04L 7/0004 |
| | | | 324/601 |
| 7,444,559 B2 | 10/2008 | Swanson et al. | |
| 7,479,912 B1 | 1/2009 | Xianggang et al. | |
| 7,603,246 B2 | 10/2009 | Newcomb et al. | |
| 7,676,715 B2* | 3/2010 | Miller | G01R 31/31926 |
| | | | 714/710 |
| 7,944,818 B2 | 5/2011 | Barthel et al. | |
| 8,116,162 B1 | 2/2012 | Wennekamp et al. | |
| 8,218,537 B1 | 7/2012 | Gui et al. | |
| 8,497,704 B2 | 7/2013 | Singh et al. | |
| 8,681,839 B2 | 3/2014 | Bulzacchelli et al. | |
| 8,767,531 B2 | 7/2014 | Ferraiolo et al. | |
| 8,898,504 B2 | 11/2014 | Baumgartner et al. | |
| 2002/0066001 A1* | 5/2002 | Olarig | G06F 13/1694 |
| | | | 711/170 |
| 2002/0093994 A1 | 7/2002 | Hendrickson et al. | |
| 2002/0103618 A1 | 8/2002 | Schleifer et al. | |
| 2002/0145981 A1 | 10/2002 | Klinker et al. | |
| 2004/0156396 A1 | 8/2004 | Amick et al. | |
| 2005/0213593 A1 | 9/2005 | Anderson et al. | |
| 2005/0216736 A1 | 9/2005 | Smith | |
| 2006/0045215 A1 | 3/2006 | Ballantyne et al. | |
| 2006/0123297 A1 | 6/2006 | Reichert et al. | |
| 2006/0159113 A1 | 7/2006 | Kizer | |
| 2006/0244505 A1* | 11/2006 | Fung | G06F 1/10 |
| | | | 327/293 |
| 2007/0002939 A1* | 1/2007 | Daugherty | H04L 1/24 |
| | | | 375/219 |
| 2007/0177576 A1 | 8/2007 | Johansen et al. | |
| 2007/0183319 A1 | 8/2007 | Rug et al. | |
| 2007/0240000 A1 | 10/2007 | Chapuis et al. | |
| 2007/0260841 A1 | 11/2007 | Hampel et al. | |
| 2008/0320191 A1 | 12/2008 | Bravo et al. | |
| 2010/0005202 A1 | 1/2010 | Ferraiolo et al. | |
| 2010/0005365 A1 | 1/2010 | Buchmann et al. | |
| 2010/0046543 A1 | 2/2010 | Parnaby | |
| 2010/0055846 A1 | 3/2010 | Lii et al. | |
| 2010/0121994 A1 | 5/2010 | Kim et al. | |
| 2010/0174955 A1 | 7/2010 | Carnevale et al. | |
| 2010/0232489 A1 | 9/2010 | Watkins | |
| 2010/0265820 A1 | 10/2010 | Feng et al. | |
| 2010/0271092 A1 | 10/2010 | Zerbe et al. | |
| 2011/0126081 A1* | 5/2011 | Kasamsetty | G11C 29/028 |
| | | | 714/768 |
| 2011/0176372 A1* | 7/2011 | Baba | G06F 13/4239 |
| | | | 365/189.05 |
| 2011/0211404 A1* | 9/2011 | Raghunathan | G11C 7/1066 |
| | | | 365/193 |
| 2011/0235459 A1 | 9/2011 | Ware et al. | |
| 2011/0320881 A1 | 12/2011 | Dodson et al. | |
| 2011/0320921 A1 | 12/2011 | Gower et al. | |
| 2012/0106539 A1 | 5/2012 | Ferraiolo et al. | |
| 2012/0155253 A1 | 6/2012 | Johansen | |
| 2012/0221769 A1* | 8/2012 | Ware | G06F 13/1694 |
| | | | 711/103 |
| 2013/0287784 A1 | 10/2013 | Brouxhon et al. | |

OTHER PUBLICATIONS

"Continuous Time, Interface Calibration for a High-Speed Interface—Decision Feedback Equalization (DFE)", published anonymously in ip.com, Document No. IPCOM000196836D, Jun. 17, 2010.

"Real Time, Interface Calibration for a High-Speed Interface—Continuous Time Linear Equalization (CTLE)", published anonymously in ip.com, Document No. IPCOM000196834D, Jun. 17, 2010.

"Continuous Time, Interface Calibration for a High-Speed Interface—DC Offset Calibration", published anonymously in ip.com, Document No. IPCOM000196833D, Jun. 17, 2010.

"Continuous Time, Interface Calibration for a High-Speed Interface—VGA Gain Adjust", published anonymously in ip.com, Document No. IPCOM000196835D, Jun. 17, 2010.

D. M. Berger et al., "High-speed source-synchronous interface for the IBM System z9 processor", IBM J. Res. & Dev., vol. 51, No. 1/2, Jan./Mar. 2007.

Anonymously; "Method of Achieving Minimal Skew Across Multiple Transmit Channels of a Transceiver"; An IP.com Prior Art Database Technical Disclosure; http:ip.com/IPCOM/000201498; Nov. 12, 2010.

Vestas Wind Systems A/S et al.; "Power Saving Modes in Modern Distributed Control Systems Utilizing Ethernet Communication Networks"; An IP.com Prior Art Database Technical Disclosure; http://ip.com/IPCOM/000220471; Aug. 1, 2012.

* cited by examiner

EFFICIENT CALIBRATION OF A LOW POWER PARALLEL DATA COMMUNICATIONS CHANNEL

CROSS REFERENCE TO RELATED APPLICATION

The present application is a continuation of pending U.S. patent application Ser. No. 13/561,446, filed Jul. 30, 2012, entitled "Efficient Calibration of a Low Power Parallel Data Communications Channel", which is herein incorporated by reference. The present application claims priority under 35 U.S.C. §120 of U.S. patent application Ser. No. 13/561,446.

FIELD OF THE INVENTION

The present invention relates to digital data processing, and in particular to the design and operation of communications circuit interfaces for communicating between digital data devices.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication links coupled to a network, etc. CPU's (also called processors) are capable of performing a limited set of very simple operations, but each operation is performed very quickly. Data is moved between processors and memory, and between input/output devices and processors or memory. Sophisticated software at multiple levels directs a computer to perform massive numbers of these simple operations, enabling the computer to perform complex tasks, and providing the illusion at a higher level that the computer is doing something sophisticated.

Continuing improvements to computer systems can take many forms, but the essential ingredient of progress in the data processing arts is increased throughput, i.e., performing more of these simple operations per unit of time.

The computer is a sequential state machine in which signals propagate through state storing elements synchronized with one or more clocks. Conceptually, the simplest possible throughput improvement is to increase the speeds at which these clocks operate, causing all actions to be performed correspondingly faster.

Data must often be communicated across boundaries between different system components. For example, data may need to be communicated from one integrated circuit chip to another. In countless instances, an operation to be performed by a component can not be completed until data is received from some other component. The capacity to transfer data can therefore be a significant limitation on the overall throughput of the computer system. As the various components of a computer system have become faster and handle larger volumes of data, it has become necessary to correspondingly increase the data transferring capability ("bandwidth") of the various communications paths.

Typically, a communications medium or "bus" for transferring data from one integrated circuit chip to another includes multiple parallel lines which carry data at a frequency corresponding to a bus clock signal, which may be generated by the transmitting chip, the receiving chip, or some third component. The multiple lines in parallel each carry a respective part of a logical data unit. For example, if eight lines carry data in parallel, a first line may carry a first bit of each successive 8-bit byte of data, a second line carry a second bit, and so forth. Thus, the signals from a single line in isolation are meaningless, and must somehow be combined with those of other lines to produce coherent data.

The increased clock frequencies of processors and other digital data components have induced designers to increase the speeds of bus clocks in order to prevent transmission buses from becoming a bottleneck to performance. This has caused various design changes to the buses themselves. For example, a high-speed bus is typically implemented as a point-to-point link containing multiple lines in parallel, each carrying data from a single transmitting chip to a single receiving chip, in order to support operation at higher bus clock speeds.

It is impossible to avoid certain variations among the lines of a single parallel link (whether a result of manufacturing tolerance, line geometry, or other factors). These variations become more critical as bus speeds are increased. In order to support inter-chip data transfer at high bus clock speeds, the lines of a data communications bus can be individually calibrated to compensate for these and other variations. However, so sensitive is the communications mechanism in many modern data processing environments that calibration parameters can drift significantly during operation, so that periodic re-calibration is required to achieve acceptable performance.

Calibration of the lines of a parallel link may require that multiple factors be taken into account and compensated for, such as variations in timing, voltage offsets, signal amplification, interference from adjacent data bits, and so forth. Support for calibration and periodic recalibration of the lines may require complex analog and other circuitry which can sense discrepancies and/or be tuned to accommodate them. Such complex circuitry can add significantly to the cost and power consumption of the chip.

Recently, there has been interest in an electronic packaging technique involving the mounting of multiple integrated circuit semiconductor chips on a single silicon carrier. Conceptually, this is similar to conventional techniques which mount multiple chips on a single printed circuit board having a fiberglass or other polymeric base and one ore more layers of circuit patterns embedded therein, the silicon carrier substituting for the conventional printed circuit board. However, the silicon carrier is substantially smaller than the conventional printed circuit board, and supports packaging of integrated circuits at significantly higher densities.

Another recent electronic packaging development involves 3D chip stacking, in which multiple integrated circuit semiconductor chips are stacked one on top of another, to connect directly with other chips in the stack without an intermediary carrier. This technique similarly supports packaging at significantly higher densities.

The use of the silicon carrier and/or 3D chip stacking introduce new engineering challenges. In particular, the increased circuit density aggravates the problems of heat generation and dissipation, and makes reduced power consumption a high priority.

Data communications buses for communicating data among multiple integrated circuit chips consume a significant portion of the power consumed by the chips. Continuous calibration only increases the power requirements of these buses. A need exists for improved devices or methods which reduce power consumption in data communications buses, and in particular, in data communications buses which are continuously calibrated and/or may be used to communicate data among chips mounted on silicon carriers or chips directly connected with one another in a 3D stack arrangement.

SUMMARY

A communications mechanism for communicating digital data between two devices includes a parallel data link of multiple parallel lines which is maintained in a continuously calibrated state. Although maintained in a continuously calibrated state, actual calibration operations can be flexibly performed at dynamically variable intervals and/or interrupted as determined by an automated mechanism to reduce interference with functional operation.

In a first aspect, calibration is initiated responsive to a command generated by an external software process executing in a programmable processor. Such a software process can reduce the frequency of calibration by initiating calibration responsive to some indication that it may be necessary as indicated by one or more factors, rather than according to a predetermined schedule. For example, such factors could include any of an observed temperature change, an observed increase in errors in communicated data, a rate of change in a calibrated value, and so forth. Such an external software process might also take into account a level of activity of the digital data device, the parallel data link, or any other component of the digital data device.

In a second aspect, calibration is initiated responsive to detection of a probable current need for calibration indicated by at least one current state parameter other than a predetermined schedule. For example, such a parameter could be any of an observed temperature change, an observed increase in errors in communicated data, or a rate of change in a calibrated value.

In a third aspect, calibration is initiated at least in part responsive to detection of probable minimal disruption of essential device function, as indicated by a low level of activity of at least one component of the digital data device.

In a fourth aspect, calibration is achieved by temporarily suspending transmission of data on at least one line to perform at least one calibration operation using the line(s), and the calibration operation is selectively interruptible to transmit functional data on the line(s) on demand. Preferably, calibration is performed in multiple successive discrete time intervals, and at the conclusion of each interval is interrupted to transmit any functional data awaiting transmission. It would be possible to temporarily suspend transmission of data on all lines, or on fewer than all lines.

In a first variation of a preferred embodiment, a low-power parallel data link is used to communicate data between two integrated circuit chips mounted on a common silicon carrier. In a second variation of the preferred embodiment, a low-power parallel data link is used to communicate data between two integrated circuit chips mounted directly to each other in a 3D stacked configuration. In either variation, the link includes multiple parallel lines sharing a common clock domain, the phase of the common clock being calibrated. A known pseudo-random bit stream is scrambled with transmitted data at the transmitting device, and unscrambled in the receiving device. The common clock is calibrated by temporarily suspending transmission of data on the lines, causing transmission of the unaltered pseudo-random bit pattern, and detecting non-zero output in the unscrambled data at the receiver.

A communications mechanism in accordance with the preferred embodiment provides a reduced power interface when compared with conventional techniques involving significant hardware to support continuous calibration. Furthermore, disruption caused by calibration is minimized by any of various techniques disclosed herein.

The details of the present invention, both as to its structure and operation, can best be understood in reference to the accompanying drawings, in which like reference numerals refer to like parts, and in which:

DETAILED DESCRIPTION

Communications Media Terminology

Figure 1:
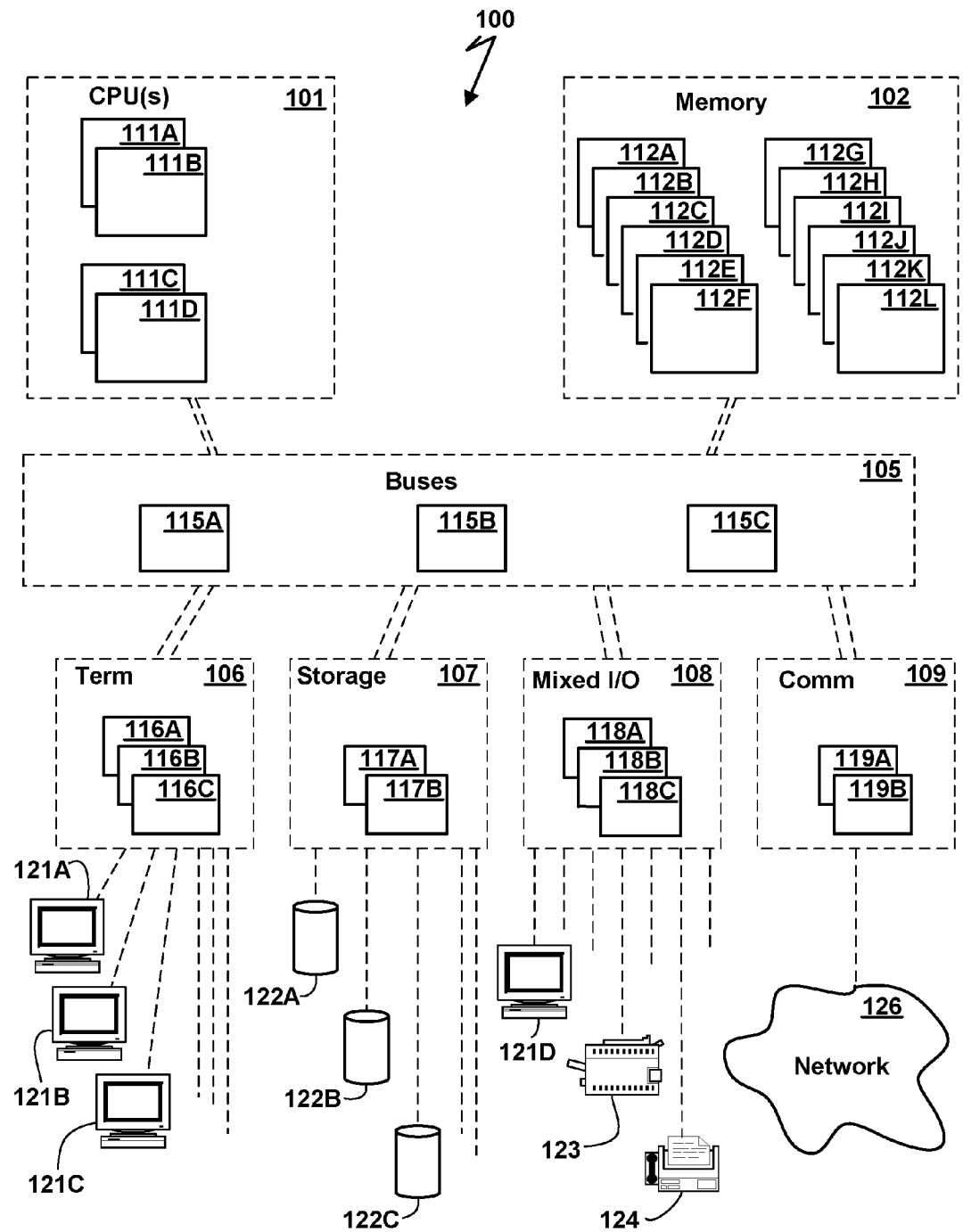
FIG. 1 is a high-level block diagram of the major hardware components of an exemplary computer system having multiple integrated circuit chips and one or more high-speed buses providing communications paths among the integrated circuit chips, according to the preferred embodiment.

As described herein, a digital communications media contains multiple lines in parallel which collectively transmit logical units of data from a transmitter to a receiver.

As used herein, a "line" is a communications medium which conveys a single bit of digital data at a time from a transmitter to one or more receivers. Commonly, a line is a single electrically conductive wire which transmits an electrical voltage, the value of the voltage with respect to a reference (such as ground) indicating the value of the bit of data. However, a "line" as used herein could also mean a pair of electrically conductive wires which each transmit a respective voltage, the relative values of the two voltages indicating the value of the bit of data. A line may be bidirectional, having both transmitting and receiving circuitry at either end, or may be unidirectional, having only transmitting circuitry at one end and only receiving circuitry at the other.

As used herein, "parallel lines" or a "parallel bus" refers to a set of multiple lines as explained above, wherein the lines of the set collectively are used to convey coherent data. Each line of the set only conveys some part of the data, which itself is only a meaningless stream of bits until it is combined and interleaved with the bits from the other lines to produce coherent data. In some parallel bus implementations, the bits of a logical unit of data are simultaneously presented at the receiver on a common clock signal. For example, if an 8-line parallel bus carries one byte of data at a time, all bits of that byte may be clocked into the receiver circuits simultaneously. However, this restriction is difficult or impossible to maintain as bus clock speeds increase due to the relative amount of data skew. Accordingly, in modern high-speed parallel buses, each of the lines may present data at the receiver at different phases and be sampled independently by their respective receiver circuits. Sometimes this latter form of parallel bus is referred to as a "striped serial bus", to distinguish it from slower buses which sample on a common clock. Unless otherwise qualified, a "parallel bus" or "parallel lines" as used herein does not imply any particular clock arrangement, and could be of the common clock phase type or of the independent clock phase type.

In the preferred embodiments described herein, a high-speed parallel bus is a point-to-point link, in which data is communicated only between a pair of devices, i.e from one transmitter to one receiver. However, the present invention is not necessarily limited to use in point-to-point links, and unless otherwise qualified herein, the terms "parallel bus" or "parallel lines" should not be taken to require that the bus or lines be a point-to-point link. For example, a parallel bus could be a single-to-multi-point medium, in which there is a single transmitting device and multiple receiving devices, or a medium having multiple possible transmitting devices, which typically requires some form of arbitration.

One of the features of the communications mechanism described as a preferred embodiment herein is the ability to transmit test patterns and control commands on the same physical lines used for communicating functional data. As used herein, functional data means data used by the receiving chip, or by some other system component to which it is subsequently communicated, to perform its intended function (as opposed to test or calibration data used to test or calibrate the communications link itself, or control information used to control or coordinate the communications link, and specifically its calibration).

Hardware Overview

In the preferred embodiment, multiple integrated circuit chips of a digital data system are coupled for inter-chip communications by one or more high-speed point-to-point data links or buses, each containing multiple parallel data lines. Referring to the Drawing, wherein like numbers denote like parts throughout the several views, FIG. 1 is a high-level block diagram of the major hardware components of an exemplary general-purpose computer system having multiple integrated circuit chips and one or more high-speed buses providing communications paths among the integrated circuit chips, according to the preferred embodiment. At a functional level, the major components of system 100 are shown in FIG. 1 outlined in dashed lines; these components include one or more central processing units (CPUs) 101, main memory 102, interfaces for I/O devices such as terminal interface 106, storage interface 107, mixed I/O device interface 108, and communications/network interface 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which are typically rotating magnetic hard disk drive units, although other types of data storage device could be used. Mixed I/O device interface 108 provides an interface to these or any of various other input/output devices or devices of other types. Three such devices, terminal 121D, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth. The communications paths running between I/O device interfaces 106-109 and the devices or networks may be dedicated communication links or links which are shared (e.g., multi-drop buses), and may be generally referred to as I/O buses, whether single or multiple devices are attached thereto.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information.

Physically, the major functional units are typically embodied in one or more integrated circuit chips. Such chips are generally mounted on appropriate carriers, which may be electronic circuit card assemblies (typically having a fiberglass substrate), silicon carriers, or some other suitable carrier. Additionally, multiple chips may be stacked one on top of another, each chip being electrically coupled directly to the chip immediately above and/or below it in the stack, with only the bottom-most chip being mounted on a carrier (a configuration known as 3D stacking). In FIG. 1, CPU 101 is represented as containing four integrated circuit chips 111A-D, each of which may contain one or more processors, or may perform only part of the functions of a single processor; memory 102 is represented as containing six chips 112A-112F, buses 105 as containing three bus interface chips 115A-C, terminal interface 106 as containing three chips 116A-116C, storage interface 107 as containing two chips 117A-B, I/O and mixed I/O device interface 108 as containing three chips 118A-C, and communications interface 109 as containing two chips 119A-B. However, the actual number of such chips may vary, and different devices as well as buses which couple multiple devices may be integrated into a single chip.

Figure 2A:
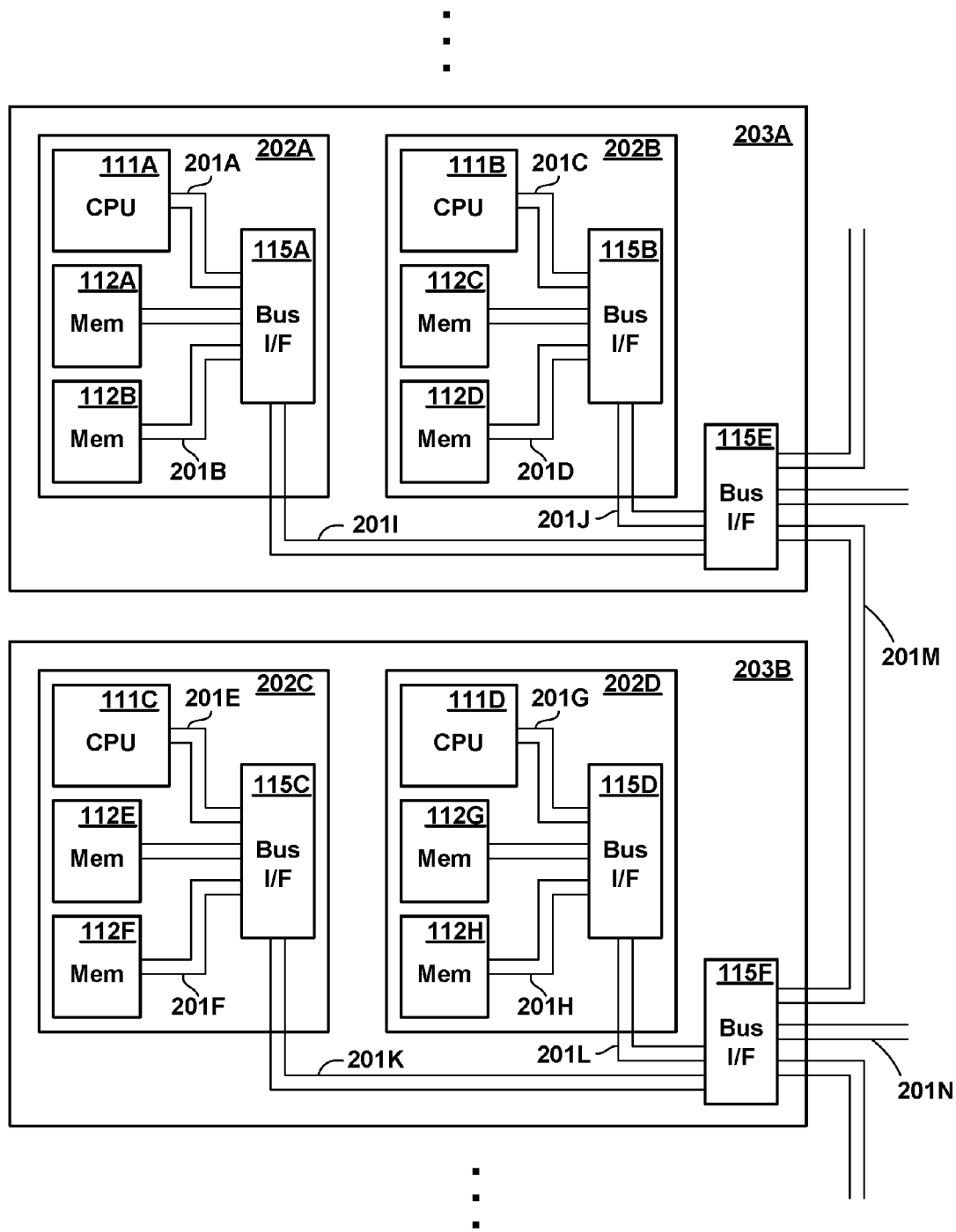
FIGS. 2A and 2B are generalized representations showing in greater detail certain hardware packaging elements of a representative portion of the computer system of FIG. 1, in accordance with different variations of the preferred embodiment.

Communication paths which connect the various components of system 100, and in particular paths connecting any of the various I/O devices with CPUs 101 or memory 102, are represented in FIG. 1 at a high level of abstraction. In fact, such paths are typically far more complex, and are generally arranged in a hierarchy. FIG. 2A is a generalized representation showing in greater detail certain hardware packaging elements of a representative portion of CPU 101, memory 102, and buses 105 for coupling CPU and memory of the computer system 100 of FIG. 1, in accordance with a variation of the preferred embodiment in which certain integrated circuit chips are mounted on silicon carriers.

Referring to FIG. 2A, multiple integrated circuit chips are each mounted on a respective silicon carrier 202A-202D (herein generically referred to as feature 202), which are in turn mounted on a respective electronic circuit card 203A, 203B (herein generically referred to as feature 203). FIG. 2A represents two circuit cards 203, each having two silicon carriers 202 mounted thereon, it being understood that the number of silicon carriers and circuit cards may vary, and for a large computer system is typically much greater. For example, in the exemplary system portion of FIG. 2A, carrier 202A contains processor chip 111A, memory chips 112A, 112B, and bus interface chip 115A. Carrier 202B contains similar components. Both carrier 202A and 202B are mounted on circuit card 203A. Bus interface chip 115E is also mounted directly on circuit card 203.

Figure 2B:
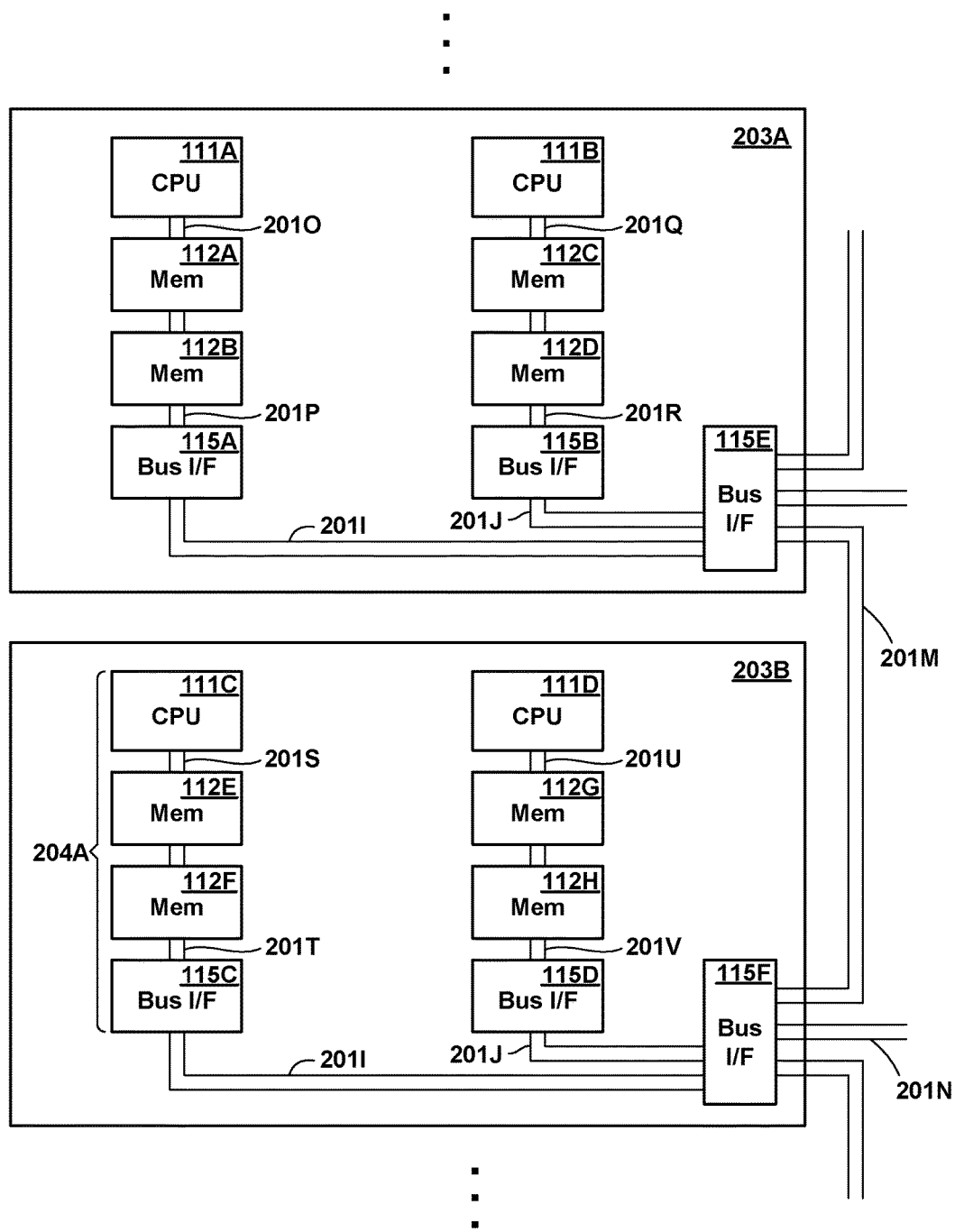

FIG. 2B is a generalized representation showing in greater detail certain hardware packaging elements of a representative portion of CPU 101, memory 102, and buses 105 for coupling CPU and memory of the computer system 100 of FIG. 1, in accordance with a variation of the preferred embodiment in which certain integrated circuit chips are mounted in a 3D stacked configuration. Referring to FIG. 2B, multiple groups of integrated circuit chips are stacked one on top of another in stacks 204A-D (herein generically referred to as feature 204). For example, processor chip 111A, memory chips 112A, 112B, and bus interface chip 115A are stacked one on top of another in a first stack 204A, while a second stack 204B comprises chips 111B, 112C, 112D, and 115B, and so on. Both stacks 204A and 204B are mounted on circuit card 203A. Bus interface chip 115E is also mounted directly on circuit card 203. FIG. 2B represents two circuit cards 203, each having two stacks 204 mounted thereon, it being understood that the number of stacks, circuit cards and chips may vary, and for a large computer system is typically much greater.

System 100 further contains multiple point-to-point communication links 201A-201V (herein generically referred to as feature 201), each coupling a respective pair of integrated circuit chips. Logically, these links convey data in both directions, but physically they are often constructed as a two separate sets of parallel lines, each set conveying data in a single direction opposite that of the other set. Some of these links couple pairs of integrated circuit chips mounted on the same silicon carrier (e.g. links 201A-201H), some couple pairs of integrated circuits mounted on the same circuit card (e.g. links 201I-201L), and some couple pairs of chips mounted on different cards (e.g. links 201M, 201N). For example, in the embodiment shown in FIG. 2A, links 201A, 201C couple processor chips 111A, 111B, respectively to bus interface chips 115A, 115B respectively; links 201B, 201D couple memory chips 112B, 112D, respectively to bus interface chips 115A, 115B, respectively; links 201I, 201J couple bus interface chips 115A, 115B, respectively, to bus interface chip 115E. Alternatively, in the embodiment shown in FIG. 2B, links 201O, 201Q couple processor chips 111A, 111B, respectively to memory chips interface chips 112A, 112C respectively; links 201P, 201R couple memory chips 112B, 112D, respectively to bus interface chips 115A, 115B, respectively; links 201I, 201J couple bus interface chips 115A, 115B, respectively, to bus interface chip 115E. There thus exists a communications path between any two chips the same carrier through a local bus interface chip on the carrier, between any two chips in the same stack (which may traverse one or more other chips in the same stack), and between any two chips on the same card through a card bus interface chip (e.g. bus interface chip 115E). Additionally, link 201M, connecting bus interface chip 115E with bus interface chip 115F, and link 201N, connecting bus interface chip 115F with another module (not shown), couple devices mounted on different circuit cards. Link 201N might couple chip 115F with a similar bus interface chip servicing additional processor and memory chips, or it might couple chip 115F with some other device, such as an I/O controller chip for connecting to one or more I/O buses.

Although all of links 201A-V are logically point-to-point links, they do not necessarily have identical properties: they may operate at different clock speeds; they may have different widths (i.e., different numbers of parallel lines); they may operate at different voltages; some may contain bidirectional lines while others contain separate sets of unidirectional lines; and/or any of various additional parameters may be different. The present invention is not necessarily limited to parallel links of any particular type. However, in an exemplary embodiment, it is used for parallel links between chips mounted on a common silicon carrier, such as any of links 201A-201H, and/or is used for parallel links between chips mounted in a common chip stack, such as any of links 201O-201V. It is expected that links between chips mounted on a common silicon carrier or a common chip stack will benefit most from the advantages of the present invention, such as reduction in power consumption, simplified interface, and so forth, while exhibiting comparatively little data skew among different lines of the link (and therefore being suitable for a common clock phase).

It should be understood that FIGS. 1, 2A and 2B are intended to depict the representative major components of system 100 at a high level, that individual components may have greater complexity than represented in FIGS. 1, 2A and 2B, that components other than or in addition to those shown in FIGS. 1, 2A and 2B may be present, that the number, type and configuration of such components may vary, and that a large computer system will typically have more components than represented in FIGS. 1, 2A and 2B. Several particular examples of such additional complexity or additional variations are disclosed herein, it being understood that these are by way of example only and are not necessarily the only such variations.

Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients). While a large system typically contains multiple CPUs and multiple I/O buses, the present invention is not limited to use in systems of any particular size, and it would be possible to construct a system having only a single CPU and/or a single I/O bus. Furthermore, the present invention is not limited to use in general-purpose computer systems, but could be used in any digital data system having multiple integrated circuit chips which communicate with one another, whether called a computer system or not. By way of example and not limitation, such digital data systems could include control systems for machinery, entertainment systems, security and monitoring systems, medical systems, network routing mechanisms, telephonic and cell communications devices, personal digital devices, and so forth.

While FIGS. 2A and 2B represents a system in which each carrier or stack contains at least one processor and some memory, as might be typical of a non-uniform memory access (NUMA) or nodal computer system, all memory might alternatively be placed on one or more dedicated cards to which processors have uniform access. It will also be understood that other communications links which are not point-to-point links may be present; for example, I/O buses (not shown in FIG. 2A or 2B) often operate at slower speeds and may be embodied as multi-drop buses.

While various system components have been described and shown at a high level, it should be understood that a typical computer system contains many other components not shown, which are not essential to an understanding of the present invention.

Figure 3:
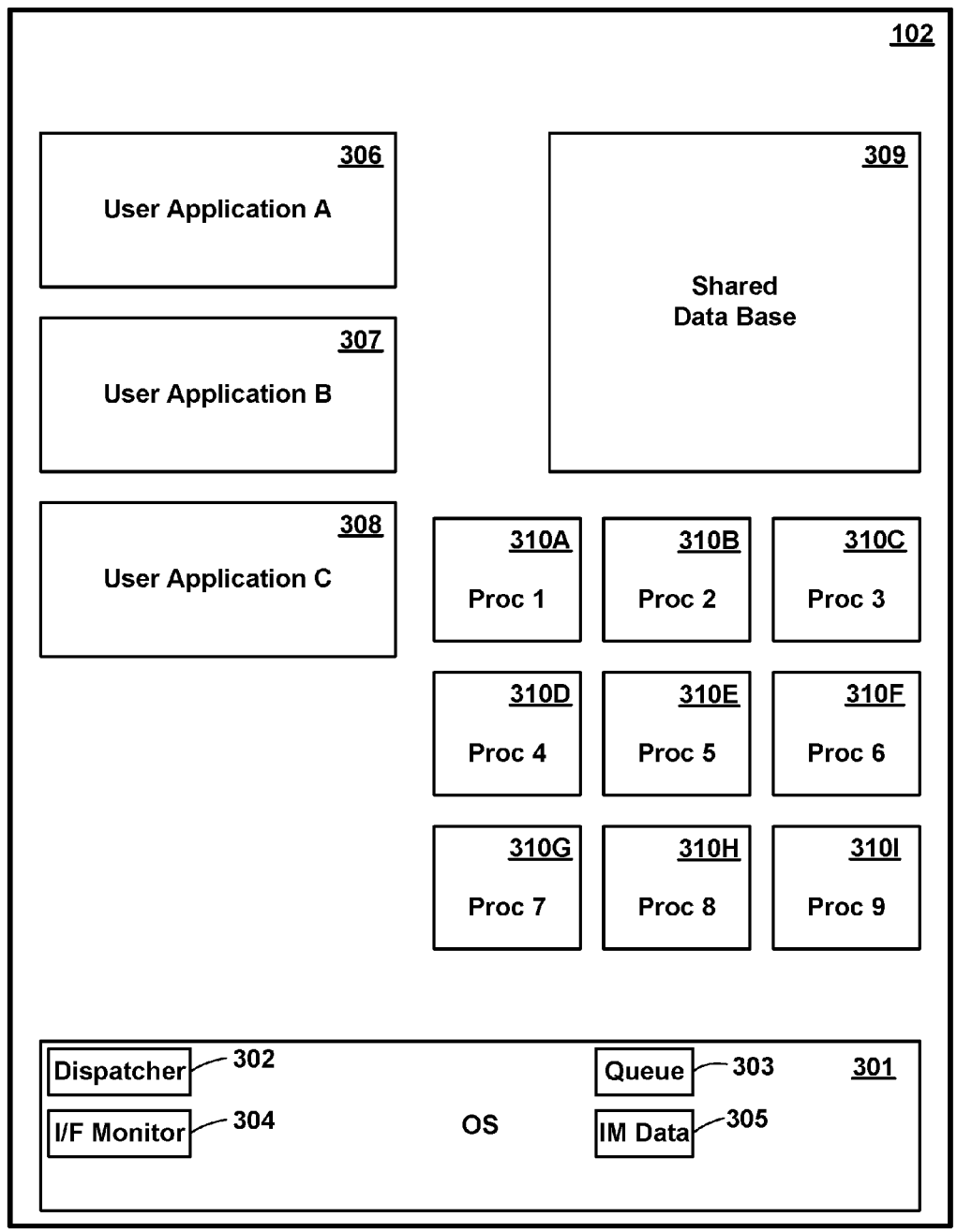
FIG. 3 is a conceptual illustration of the major software components of the computer system of FIG. 1, according to the preferred embodiment.

FIG. 3 is a conceptual illustration of the major software components of system 100 in memory 102. Operating system 301 comprises executable computer program code and associated state data providing various low-level software functions, such as device interfaces, management of memory pages, etc. In particular, operating system 301 is a multi-tasking operating system which supports the concurrent execution of multiple active tasks and the sharing of system resources among those tasks, as is well-known in the art. Tasks are dispatched to respective processors for execution by dispatcher 302 from at least one dispatch queue 303, execute until some event causes them to stop, and are either returned to queue 303 or placed in a wait state to wait for some relatively long latency event (such as a disk drive access).

In the preferred embodiment, operating system 301 further includes an interface monitor 304 for regulating the calibration of an least one parallel communications link 201 interface hardware. In particular, interface monitor 304 monitors any of various events or conditions which may indicate a probable impending need for calibration of the parallel communications link and/or which may indicate that the current level of activity of one or more components is sufficiently low that disruption of essential function due to calibration will be minimal. Responsive to detecting appropriate circumstances for calibration, interface monitor 304 issues one or more commands causing calibration of one or more links 201. Like other components of operating system 301, interface monitor 304 is executable computer programming code which executes on CPU 101. Interface monitor 304 is activated periodically for execution causing it to be dispatched by dispatcher 302 to a processor for execution, and when activated uses interface monitor data 305 to determine whether calibration of a parallel communications link 201 should be performed. A single interface monitor may be used to regulate calibration of multiple links 201, or a separate interface monitor may be used for each link. The operation of interface monitor 304 is explained in greater detail herein.

Although in the illustrative embodiment, interface monitor executes on one or more CPUs of system 100 and resides at addressable locations of main memory, it would alternatively be possible to execute interface monitor in a special-purpose processor (not shown). For example, such a special-purpose processor might be a service processor which is used for any of various maintenance and control functions, such as system initialization, power control, hardware monitoring and failure detection, software updating, and so forth, and/or for providing a special interface for use by privileged users for purposes of system configuration and maintenance.

Software components of system 100 may further include one or more user application computer programs 306-308, of which three are shown for illustrative purposes in FIG. 3, it being understood that this number may vary, and is often much larger. User applications 306-308 may include any of various applications, now known or hereafter developed, for performing useful work on a computer system, such as accounting, word processing, web browsing, calendaring, computer program code development, process control, etc. One or more of user applications 306-308 may access an external database of shared data 309, which may include functions for accessing data in database 309.

System 100 maintains separate process state data 310A-I for each of multiple active processes (herein referred to generically as feature 310). Process state data may include, e.g., a process identifier, a user identifier, a call-return stack, access rights, and any other required data which is unique to the process.

Various software entities are represented in FIG. 3 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 3, it will be understood that the actual number of such entities may vary, and in particular, that in a complex code digital data processing environment, the number and complexity of such entities is typically much larger. Additionally, although software components 301-310 are depicted in FIG. 3 on a single computer system 100 for completeness of the representation, it is not necessarily true that all programs, functions and data will be present on a single computer system or will be performed on a single computer system.

While the software components of FIG. 3 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 3 is not meant to imply any particular memory organizational model, and that system 100 might employ a single address space virtual memory, or might employ multiple virtual address spaces which overlap.

Communications Circuit Description

Figure 4:
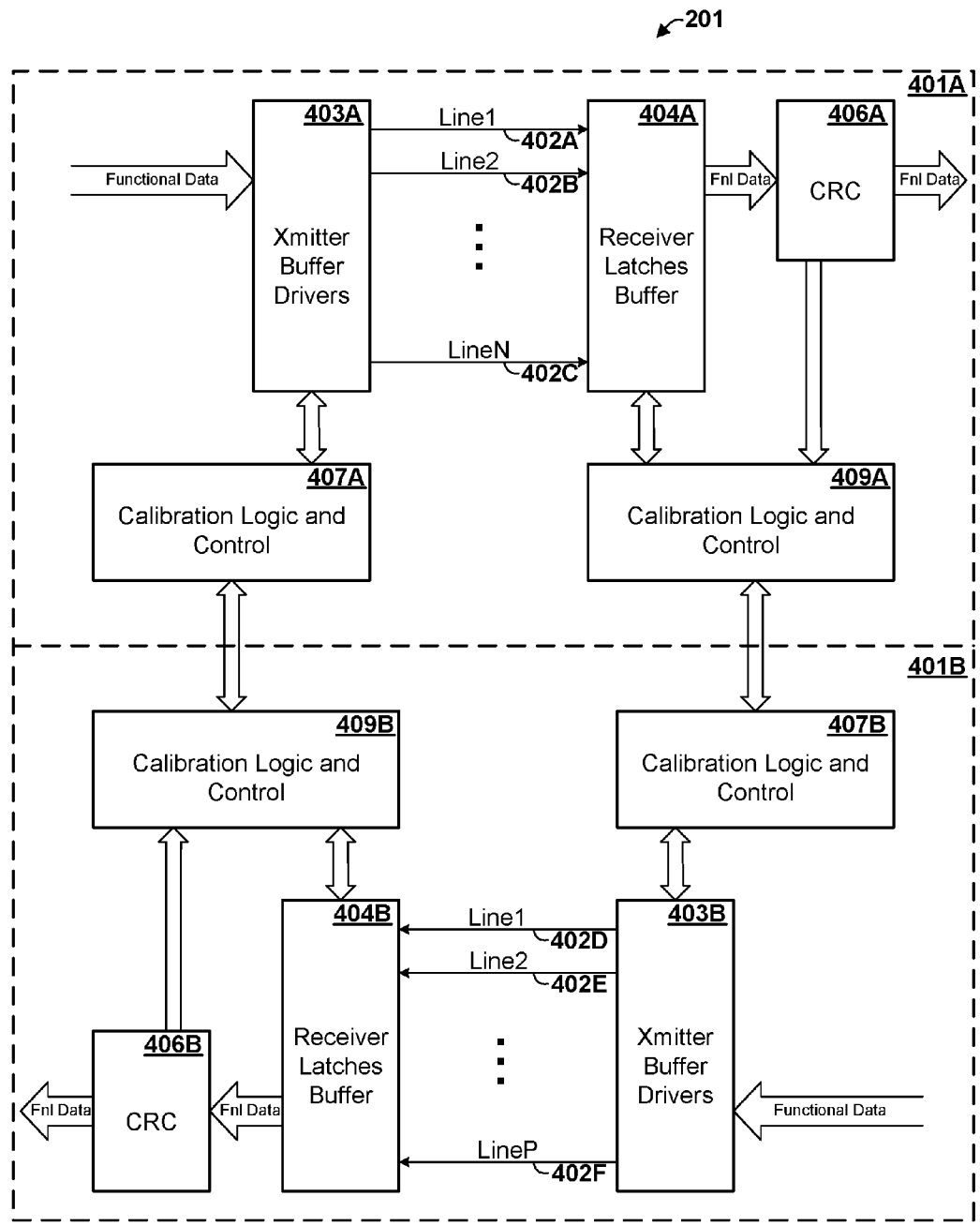
FIG. 4 is a high-level diagram showing the basic structure of a single point-to-point bidirectional link of parallel lines, according to the preferred embodiment.

FIG. 4 is a high-level diagram showing the basic structure of a single point-to-point bidirectional link of parallel lines 201, including associated circuitry, according to the preferred embodiment. In this embodiment, each individual line is unidirectional, and a bidirectional link therefore comprises two unidirectional halves 401A, 401B (herein generically referred to as feature 401) transmitting data in opposite directions.

Each unidirectional half 401 of parallel link 201 contains a respective set of parallel lines 402A-F (herein generically referred to as feature 402), which are coupled to respective transmitter interface circuitry 403A, 403B (herein generically referred to as feature 403) on the transmitting side and respective receiver interface circuitry 404A, 404B (herein generically referred to as feature 404) on the receiver side. Each unidirectional half 401 may contain the same number of lines 402 having the same parameters, or the number of lines and/or other parameters may be different. Furthermore, while it is preferred that separate sets of unidirectional lines be used, it would be alternatively possible to employ a single set of bidirectional lines, having both receiver and transmitter circuitry on each end. As a further alternative, some lines could be unidirectional while others (e.g., spare lines) could be coupled to receiver and transmitter circuitry at each end, enabling them to be used for transmitting data in either direction.

Transmitter interface circuitry preferably contains a buffer for holding data to be transmitted and drivers for transmitting data signals on lines 402, as explained in greater detail below with respect to FIG. 5. Receiver interface circuitry preferably contains optional amplifiers for amplifying incoming data signals on lines 402, latches for capturing signals, and a buffer, as explained in greater detail below with respect to FIG. 5.

Preferably, each unidirectional half 401 of parallel link 201 further contains a respective cyclic redundancy check (CRC) circuit 406A, 406B (herein generically referred to as feature 406, transmitter side calibration logic and control 407A, 407B (herein generically referred to as feature 407), and receiver side calibration logic and control 409A, 409B (herein generically referred to as feature 409). In operation, functional data passes through transmitter interface circuitry 403, across parallel lines 402, through receiver interface circuitry 404, and through CRC circuit 406. Calibration logic and control circuits 407 and 409 generally control the operation of the parallel link, including in particular the performance of re-calibration of the interface circuitry responsive to an external command, as explained in greater detail herein.

CRC circuit 406 detects errors in the functional data output by receiver interface circuitry 404, an optionally determines the logical lane in which the error occurred. CRC circuit 406 preferably performs some form of cyclic redundancy check of the functional data to detect errors and (optionally) infer a logical lane on which the erroneous bit or bits occurred. Various types of CRC are known in the art and could be used. Additionally, any of various error correction codes or error detection codes which employ redundant bits in the data stream to detect errors could be used. Preferably, any such code enables an inference to be drawn regarding the logical lane on which the error occurred. Such an inference need not be to an absolute certainty, and may be probabilistic. For example, CRC circuit 406 may use a syndrome analysis technique as described in U.S. patent application Ser. No. 12/822,498, filed Jun. 24, 2010, entitled "Failing Bus Lane Detection Using Syndrome Analysis", which is herein incorporated by reference, or any other suitable technique. A count of errors (and, optionally, the physical line 402 on which the most recent errors occurred) is maintained in calibration logic and control 409. The error count is accessible by a monitoring process executing on a CPU (i.e., external to the calibration logic and control), and can be used for purposes of determining whether to trigger a calibration cycle, as described herein.

It will be understood that "errors" refers to errors detected at the functional data output by CRC circuit 406, regardless of the cause of those errors. Such errors could be caused by a hard fault in the line or any associated circuitry, or by any of various factors which might result in an elevated rate of intermittent or "soft" errors attributable to a single line. In the case of a hard fault, the faulty line will very rapidly cause the error count to increment to some pre-defined limit, and trigger some responsive action (beyond the scope of the present disclosure). For example, where appropriate optional hardware is present (e.g., at least one physical spare line 402, multiplexers for supporting switching of physical lines, and so forth) an excessive error count may also be used to disable a faulty line and substitute a spare line, as described in commonly owned copending U.S. patent application Ser. No. 13/159,580, filed Jun. 14, 2011, entitled "Dynamic Fault Detection and Repair in a Data Communications Mechanism", and U.S. patent application Ser. No. 13/325,478, filed Dec. 14, 2011, entitled "Parallel Data Communications Mechanism Having Reduce Power Continuously Calibrated Lines", both of which are herein incorporated by reference.

Figure 5:
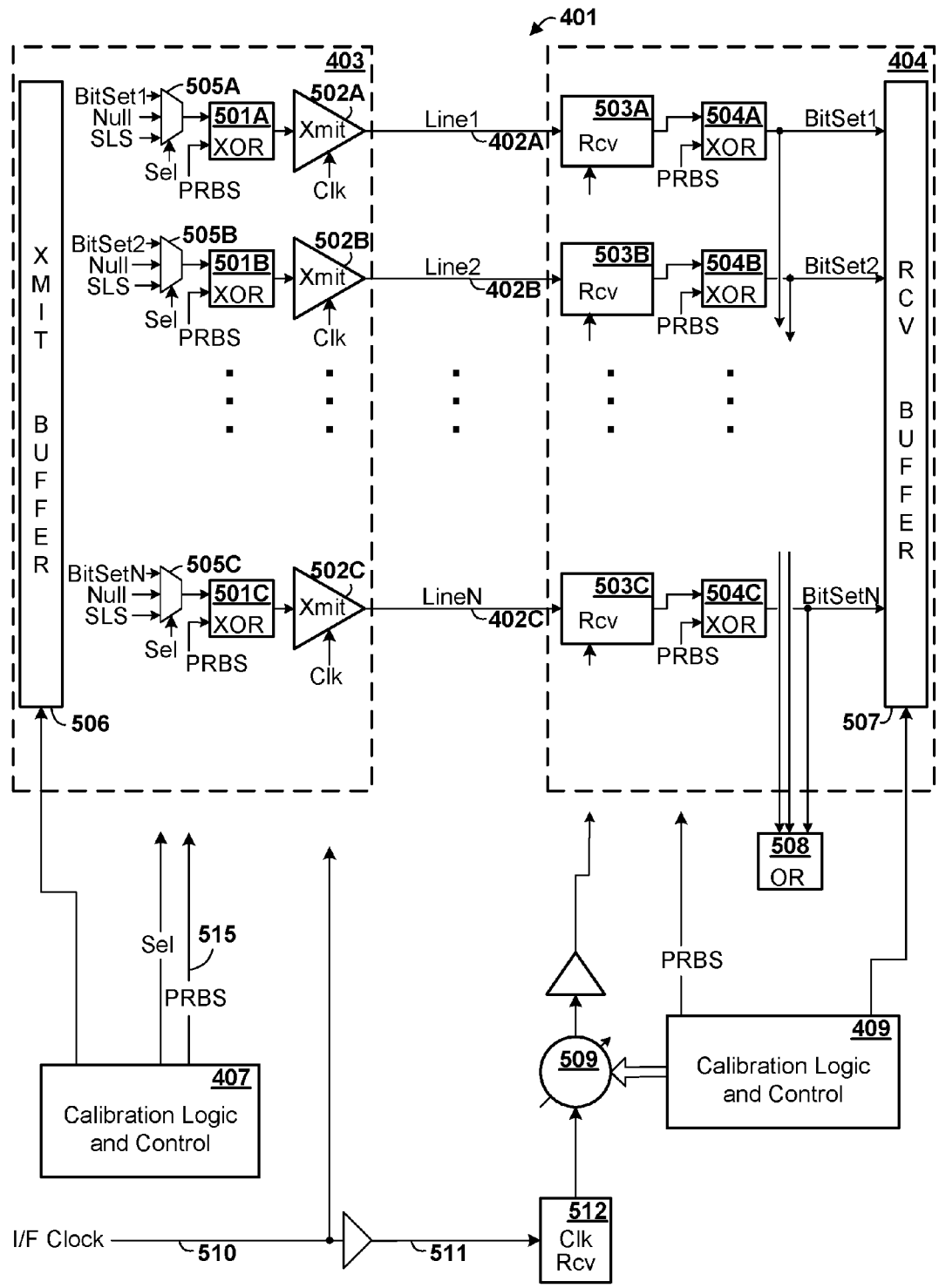
FIG. 5 is a diagram showing in greater detail the basic structure of a unidirectional half of a single point-to-point link of parallel lines, according to the preferred embodiment.

FIG. 5 is a diagram showing in greater detail the basic structure of a unidirectional half 401 of a single point-to-point link of parallel lines 201, according to the preferred embodiment. Referring to FIG. 5, a unidirectional half 401 of a parallel link contains N parallel lines 402 corresponding to an N-line wide data transmission capability.

Unidirectional link half 401 further contains a respective transmitter drive circuit 502A-C (herein generically referred to as feature 502) in the transmitting chip corresponding to each parallel line 402; a respective receiver circuit 503A-C (herein generically referred to as feature 503) in the receiving chip corresponding to each parallel line 402; a respective exclusive-OR circuit 501A-C in the transmitting chip providing input to the respective transmitter drive circuit; a respective exclusive-OR circuit 504A-C in the receiving chip receiving output from the respective receiver circuit; and a respective transmitter selector switch 505A-C (herein generically referred to as feature 505) in the transmitting chip corresponding to each parallel line 402.

On the transmitting chip, data for transmission across the link is placed in a transmit buffer 506. The buffer outputs N sets of bits in parallel, each set containing PTX bits, so that the buffer outputs a total of N*PTX bits in parallel. N represents the number of lines used to transmit functional data (also known as the "logical bus width"). Each set of PTX bits is intended for transmission by a single line 402 of the N lines. A set may contain only a single bit (PTX=1), or may contain multiple bits. The use of multiple bits enables the transmit buffer (and by extension, the logic within the transmitting chip which supplies the transmit buffer) to operate at a lower frequency than the lines 402 of the link. In the preferred embodiment, PTX=4, it being understood that this number may vary.

The output of the transmit buffer 506 is fed to transmitter selector switches 505. Each transmitter selector switch 505 corresponds to a single respective transmitter drive circuit 502 and line 402. Each transmitter selector switch receives a corresponding set of PTX bits, a set of null bits, and optionally a set of control bits as input and selects a single one of these sets as output to the corresponding exclusive-OR circuit 501, according to a control signal received from calibration logic and control 407.

Calibration Logic and Control circuit 407 also produces a PRBS23 signal 515 for all transmitter drive circuits. The PRBS23 signal is a pseudo-random bit sequence of (223)−1 bits, or 8,388,607 bits, it being understood that other bit sequences could alternatively be used. This signal is ANDed in each transmitter drive circuit with a respective enable signal (not shown) from calibration logic and control circuit 407, and the result is exclusive-ORed with the output of the respective switch 505 using scrambler circuit 501. Disabling the PRBS23 by driving a logic '0' to the corresponding AND gate causes the output of switch 505 to be transmitted unaltered; enabling the PRBS23 by driving logic '1' to the AND gate causes the output of switch 505 to be "scrambled" by exclusive-ORing with the PRBS23 bit pattern (which is then descrambled by the corresponding descrambler (exclusive-OR) 504 in the receiver circuit). When a null input is provided through a switch 505**, a pure PRBS23 signal is transmitted across the corresponding line for use in calibrating the receiver synchronization circuit on the other end. The transmitter drive circuit of the preferred embodiment can thus be used either to scramble functional data being transmitted across the link by enabling PRBS23, to transmit unaltered functional data, or to transmit an unaltered PRBS23 signal.

In the receiving chip, each receiver circuit 503 receives data signals transmitted across its corresponding line 402 from the corresponding transmitter drive circuit 502, and outputs a set of PRX bits in parallel. In the preferred embodiment, PRX=PTX=4. However PRX could be 1 or some other number; furthermore, PRX need not be the same as PTX. The output of the receiver circuit is exclusive-ORed in exclusive-OR circuit 504 with a PRBS23 signal from calibration logic and control circuit 309 in a manner similar to the transmitter drive circuits, to selectively descramble the received data or output it unaltered. Receiver buffer stores the output of the exclusive-OR operation until the data is retrieved for use by internal logic within the receiving chip.

An interface clock 510 provides clock signals to transmitter drive circuits 502 and receiver circuits 503. In the preferred embodiment, the interface clock is generated in the transmitting chip. The interface clock is driven locally to each of transmitter drive circuits 502, which may require one or more local clock signal drivers (not shown) to achieve the necessary fan-out, and driven across the chip boundaries to the receiving chip on clock line 511 to clock receiver 512 in the receiving module. Clock line 511 runs physically parallel to parallel data lines 402. Clock receiver 512 is preferably a phase-locked loop.

Phase rotator 509 receives a redriven interface clock signal from clock receiver 512. Preferably, clock receiver 512 generates four clock signals of identical frequency to the signal it receives over the clock line, and at successive 90 degree phase offsets from one another. Phase rotator 509 provides an adjustable phase shift of this redriven interface clock signal to produce a pair of phase shifted signals (herein designated R2+ and R2−), 180 degrees out of phase from each other and at double frequency from the original interface clock signal, for use by certain elements of receiver circuits 503. In particular, the pair of phase shifted signals is used to clock the sampling latches.

The output of phase rotator 509 is driven by as many drivers as are necessary to distribute the clock signal to the N receiver circuits 503. Although as shown in FIG. 4, the interface clock is generated in the transmitting chip, it could alternatively be generated in the receiving chip, or could be generated in some module external to both the transmitting chip and the receiving chip.

Interface clock 510 provides a reference clock frequency for operation of the transmitter drive circuits 502 and ensures that all data signals on lines 402 correspond to this reference frequency. Similarly, selective circuitry in receiver circuits 503 which samples the incoming data signals operates according to this reference clock frequency. In the preferred embodiment, data is transmitted on each line at the rate of four bits per cycle of the reference clock frequency, it being understood that this data rate with respect to the clock frequency could vary.

Receiver calibration logic and control circuit 409 controls the calibration of the receiver, and in particular the calibration of phase rotator 509. In order to support calibration, receiver calibration and logic control circuit 309 receives the PRX-bit output of each receiver circuit 503 and its associated exclusive-OR circuit 504, and adjusts the calibration coefficient(s) to produce an optimum stable output, as described in further detail herein.

Figure 6:
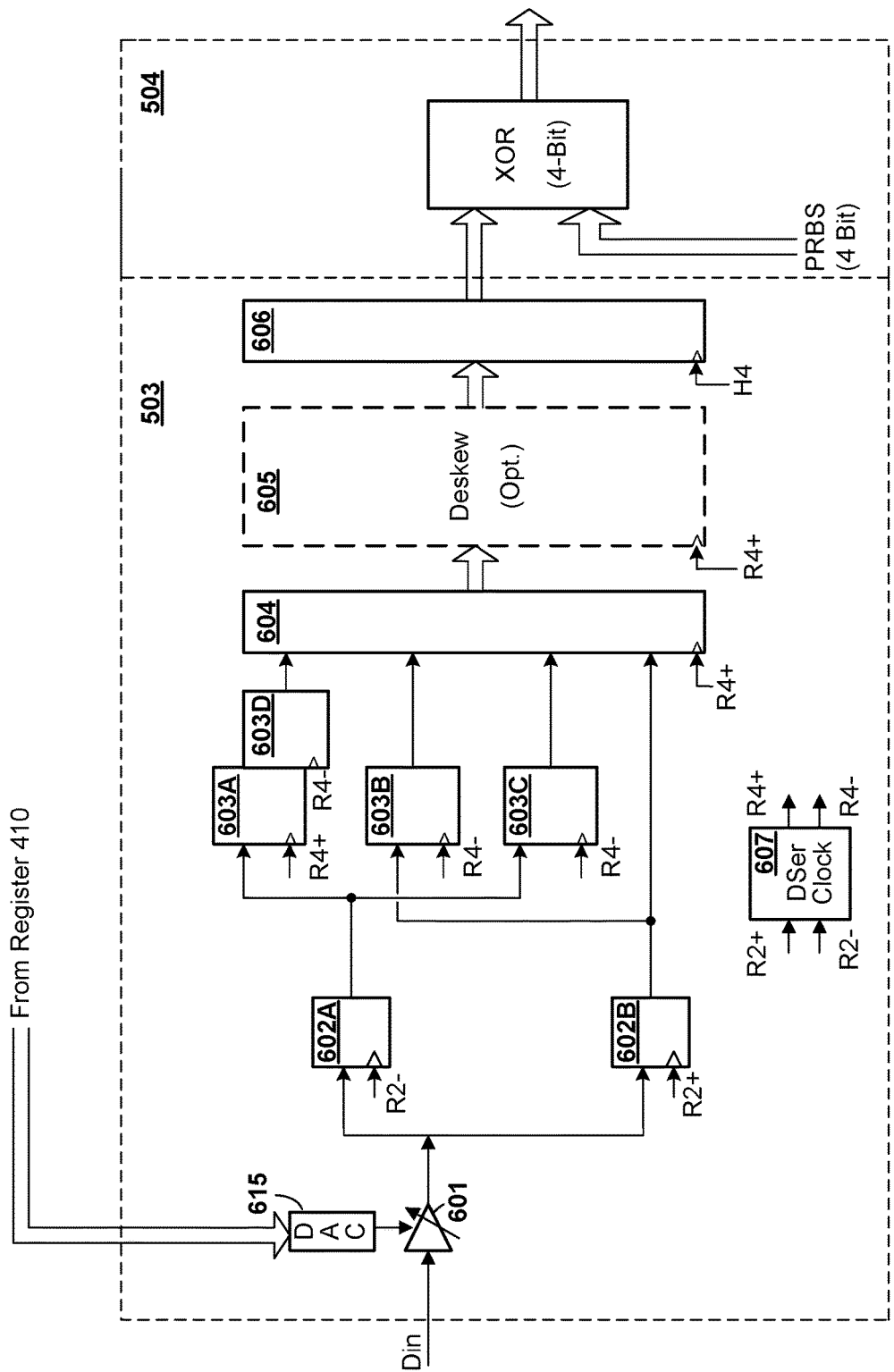
FIG. 6 is a diagram showing in greater detail certain portions of the receiver device's circuitry in a unidirectional half of a single point-to-point link of parallel lines, according to the preferred embodiment.

FIG. 6 is a diagram showing in greater detail certain portions of the receiver circuit 503 and exclusive-OR circuit 504 shown in FIG. 5, according to the preferred embodiment. The circuitry depicted is for a representative ith line of the N lines 402, identical circuitry existing for each of the N lines.

Referring to FIG. 6, incoming data optionally passes through variable gain amplifier 601. Optional variable gain amplifier (VGA) 601 provides a variable gain according to a calibrated gain coefficient, which is stored in calibration circuit 409 and provided to DAC 615 to generate an analog gain signal for VGA 601. The resultant signal (optionally amplified by VGA 601) is driven simultaneously to a pair sampling latches 602A,B (herein generically referred to as feature 602). One latch of the pair is used for sampling even data bits, while the other is used for sampling odd data bits, the latches capturing data on different phases of the R2 clock. The outputs of the sampling latches 602 are input to a deserializer, comprising four latches 603A-D.

The deserializer selects outputs of the sampler at appropriate times, and stores them in a latch bank on a common half-frequency clock signal derived from phase rotator 509 (herein referred to as the deserializer clock, or R4 clock). The deserializer includes delay latches 603A-D for capturing and delaying two even bits and one odd bit, deserializer output register 604 for outputting a 4-bit nibble in parallel, and deserialized clock generator 607 for generating a local clock signal for use by certain elements of the deserializer and optional FIFO deskew buffer 605. Delay latches 611A-D enable all four data bits to be clocked into deserializer output register 604 simultaneously, so that PRX (preferably 4) bits are output from register 604 in parallel.

Optional FIFO deskew buffer 605 receives the output of deserializer output register 604. Deskew buffer 605 contains multiple latch banks which add an adjustable delay to the PRX-bit output of the deserializer. FIFO deskew buffer preferably outputs PRX bits (i.e, 4 bits) in parallel after the adjustable delay, the data being the same as the data output of the deserializer output register. The latch banks in the FIFO deskew buffer clock data in on the deserializer clock signal. The delay of the FIFO deskew buffer 605 is adjusted in increments of PRX bit times to compensate for variations in data skew among the different lines 402 of unidirectional half 401 of the link, so that the output of FIFO deskew buffer is synchronized to the output of the FIFO deskew buffers corresponding to the other lines. The output of optional FIFO deskew buffer 605, or the output of deserializer register 604 (if no FIFO deskew buffer is used), is input to receiver output register 606. Unlike the deserializer or the deskew buffers, receiver output register 606 is synchronized to the receiver host clock domain, as shown by the H4 clock input.

The PRX-bit output of receiver output register 606 is provided to descrambler 504. Descrambler 504 descrambles scrambled data to restore it to its original form. I.e., in the preferred embodiment, a pseudo-random bit pattern is mixed with the data to be transmitted across the interface by exclusive-ORing before input to transmitting circuit 502. Mixing data with a pseudo-random bit pattern can have several advantages: it "whitens" or spreads out the spectral content of the data stream, eliminating any repetitive patterns which might otherwise degrade receiver performance; it prevents a long string of zeroes or ones in the original data from being transmitted across the line as all zeroes or all ones; and it can reduce electro-magnetic interference. Since the scrambled data is not an encoding which expands the number of bits in the data stream, it does not guarantee a logical transition with any minimum frequency; it simply makes a long string of zeroes or ones very unlikely. Descrambler 504 uses a reverse transformation of the scrambled data to restore it to its original form. Each descrambler receives a respective enable signal and a common PRBS23 signal from calibration logic and control 409. The two signals are ANDed in the descrambler, and the result is exclusive-ORed with the data received over line 402. The enable signal is used to selectively turn descrambling on or off in each receiver circuit, depending on whether the data being transmitted across the corresponding line is currently being scrambled or not. Each descrambler therefore outputs PRX bits in parallel, synchronized to the receiver host clock domain.

Among the advantages of the transmitter drive circuit and receiver synchronization circuit of the preferred embodiment is that scrambling and descrambling of data, and in particular functional data, can be selectively turned on or off. Calibration can be performed in a particular line using a PRBS23 or other suitable test pattern which guarantees any required characteristics, while functional data can independently be transmitted either scrambled or unscrambled. Certain advantages of scrambling functional data are explained above, but scrambling of functional data also consumes significant amounts of power. If scrambling of functional data is not necessary to achieving the requisite performance of the interface, then power can be conserved by shutting off scrambling. Circuit designers may not know in advance whether scrambling of data will be necessary in each and every application of an integrated circuit chip design, so providing the capability to selectively scramble data where necessary for performance, or not scramble functional data to reduce power consumption where not necessary for performance, provides the designers with added flexibility. The decision whether or not to scramble functional data can even be made dynamically within a given digital data system by monitoring the amount of drift in the various calibrated coefficients between calibration intervals. For example, where there is very little change in calibrated coefficients, it may be assumed that scrambling may be unnecessary; where large changes in coefficient values are observed, scrambling may be needed to hold drift to manageable levels. In the preferred embodiment, such monitoring can also be used to vary the calibration interval, as described herein.

Although in the preferred embodiment, scrambling/descrambling is accomplished by exclusive-ORing with a pseudo-random bit pattern, it will be appreciated that alternative techniques exist for scrambling or encoding transmitted data, including techniques which increase the number of bits in the bits stream.

As described above, phase rotator generates a pair of phase shifted signals, 180 degrees out of phase from each other and at double frequency from the original interface clock signal. In the preferred embodiment, four bits are transmitted on each line 402 with each cycle of the interface clock. Since the phase rotator generates signals at double frequency, two bits are received on the line with each cycle of resultant phase shifted signal. The pair of phase shifted clock signals are therefore designated R2+ and R2−. The even latch 602A samples on the R2+ clock signal, and the odd latch 602B samples on the R2− clock signal. Deserializer clock generator 607 derives a deserializer clock signal pair from the phase shifted signals R2+, R2− at half the frequency of R2+, R2−. Since four bits are received during this half-frequency cycle, the clock signals generated by deserializer clock generator 607 are designated R4+, R4−. Delay latch 603A clocks its signal in on the R4+ clock, while delay latches 603B-D clock their respective signals in on the R4− clock. All signals are clocked into the deserializer output register 604 on the R4+ clock.

Figure 7:
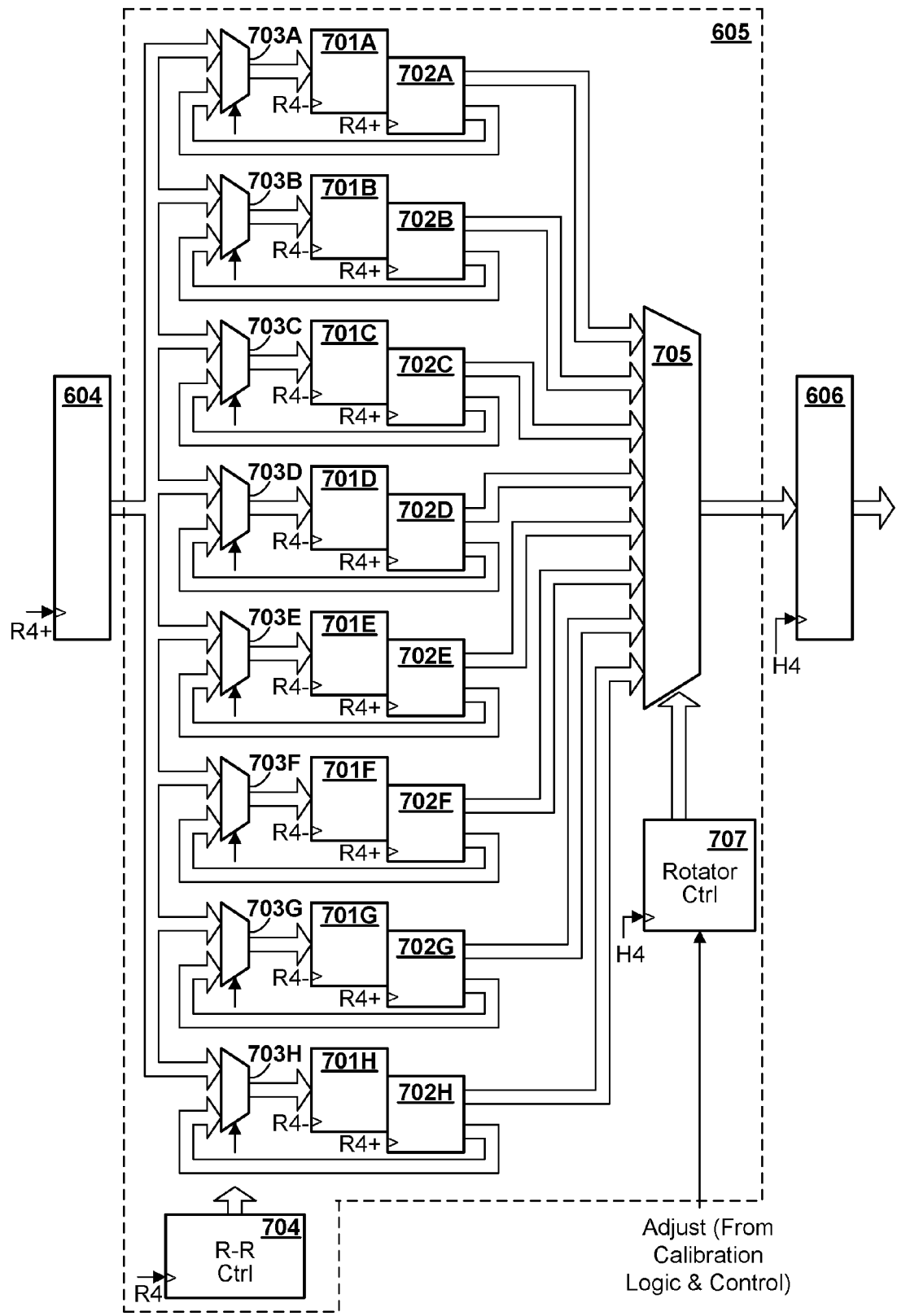
FIG. 7 is a diagram showing in greater detail certain portions of the receiver circuit shown in FIG. 6 including optional FIFO deskew buffer, according to the preferred embodiment.

FIG. 7 is a diagram showing in greater detail certain portions of the receiver circuit shown in FIG. 6 including optional FIFO deskew buffer 605, according to the preferred embodiment. FIFO deskew buffer includes multiple of delay register pairs, each containing a respective primary delay register 701A-H (herein generically referred to as feature 701) and a respective secondary delay register 702A-H (herein generically referred to as feature 702, the preferred number of delay register pairs being eight, although this number could vary. Each primary delay register 701 and each secondary delay register is a respective bank of four latches, one for each bit of parallel data. As shown in FIG. 7, primary delay registers 701 use the R4− clock (one-half cycle behind deserializer register 604), while secondary delay registers use the R4+ clock (one-half cycle behind the primary registers). A respective feedback switch 703A-H (herein generically referred to as feature 703) is associated with each pair of delay registers. The feedback switch selects either the output of deserializer register 604 or the output of the corresponding secondary register 702 for input to the corresponding primary register 701. A round-robin control 704, synchronized by the R4 clock, selects each switch 703 in turn to receive the input from deserializer register 604. During cycles in which a switch 703 is not selected by the round robin control, the switch feeds back the output of the secondary delay register to the primary register. Thus the data in each pair of delay registers is replaced every eight cycles of the R4 clock with newly arriving data.

The output of each secondary delay register 702 is connected to alignment switch 705, which selects one of these outputs for input to output register 606. Output register 606 is a set of four latches, one for each parallel bit, which are clocked by the receiver host clock (designated H4). This clock is preferably of the same frequency as the interface clock and the R4 clock, but of indeterminate phase with respect to the other two.

Alignment switch 705 selects each output of a secondary delay register 702 in turn in a round-robin manner, under control of rotator control logic 707. Rotator control logic is also clocked by the receiver host clock, although not necessarily on the same clock phase as output register 606. Normally, rotator control logic 707 operates independently, without any external input except the clock signal. However, during power-on calibration, calibration logic and control circuit 409 can incrementally advance the currently selected primary delay register output in order to adjust the length of time the data waits in a primary and secondary delay register before being clocked into output register 606.

It will be observed that the deskewing delay includes delay through multiple successive latches, i.e. memory elements which hold a data value through at least some portion of a clock cycle. Thus, in the preferred embodiment, deskew delay is not limited to delay through some number of gates or analog circuit elements, and relatively large skew is easily compensated. As noted above, the data in a delay register is replaced every eight cycles of the R4 clock, amounting to a time period equivalent to that required to transmit 32 successive bits on a single line. Thus, a 32 bit-time window is established by the FIFO deskew buffers, whereby any amount of skew falling within the window is automatically accommodated by the deskew buffers. As a result, the output of the receiver synchronization circuit according to the preferred embodiment is effectively isolated from even large amounts of dynamic and static data skew at the input.

Where optional FIFO deskew buffer 605 is not present, the output of deserializer output register 604 is input directly to output register 606. It will be observed that these operate in different clock domains (i.e., the R4 and H4 domains, respectively), so the resultant data in output register 606 is in the host clock domain.

Figure 8:
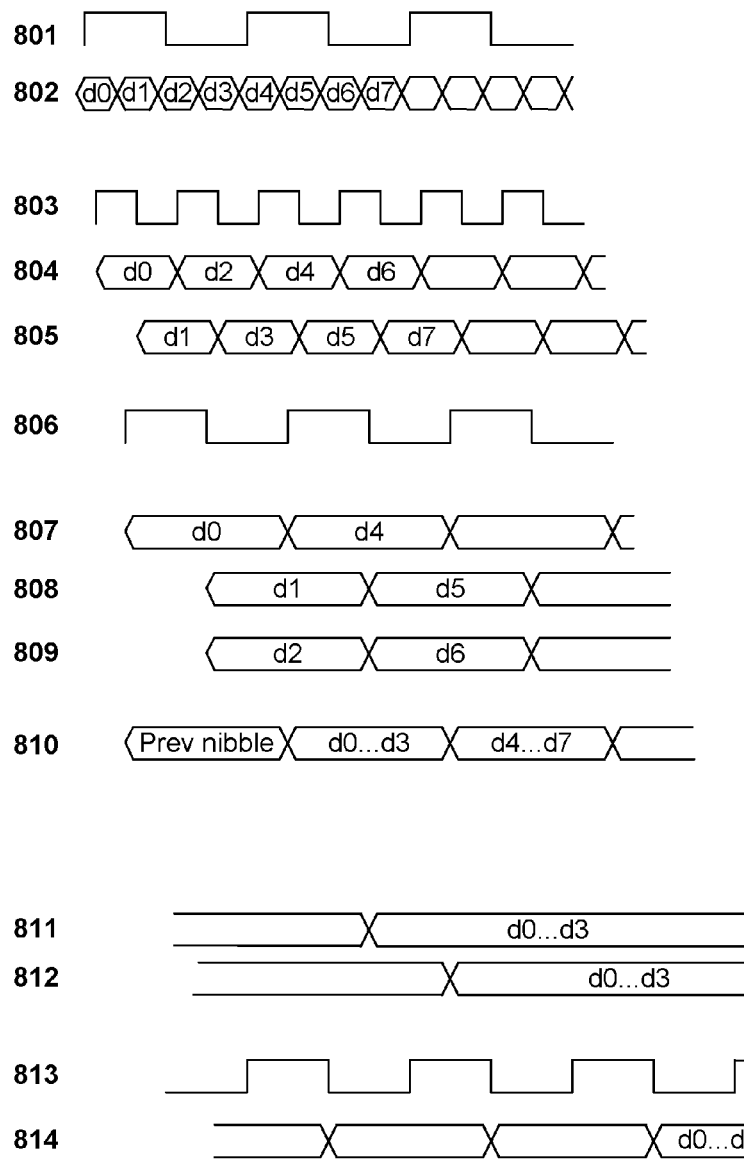
FIG. 8 is a timing diagram showing the propagation of data signals though certain portions of the receiver circuit of FIG. 6, according to the preferred embodiment.
Figure 8:
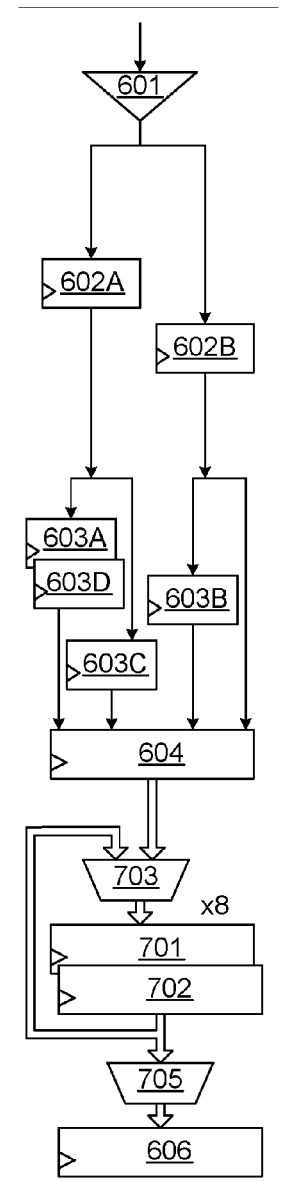

FIG. 8 is a timing diagram showing the propagation of clock and data signals though certain portions of the receiver circuit of FIG. 6, according to the preferred embodiment. The left portion of the figure illustrates a representative relative timing of selective signals during operation. The right hand portion of the figure is a simplified representation of certain circuitry described above and illustrated in FIGS. 6 and 7, which is shown as a visual aid for use in identifying the location of the corresponding clock or data signal.

Referring to FIG. 8, signal 801 represents an interface clock signal, i.e. a signal transmitted across line 511. Signal 802 represents the timing of a data signal received over line 402 and propagated through optional receiver amplifier 601. It will be observed that there are four serial bits of data in signal 802 for each cycle of interface clock signal 801; these bits need not have any phase synchronization with respect to the interface clock signal. Although there is a small delay associated with propagation through receiver amplifier 601, this delay is due to the inherent delay of the analog circuitry, and is unrelated to the timing of clock signals.

Signal 803 represents one of the phase shifted clock signals generated by phase rotator 509. If we assume that the latches sample on the falling edge, signal 803 is the R2− signal (but it could alternatively represent the R2+ signal if latches sample on the rising edge). Signal 804 represents the captured bits in sampling latch 602A, which samples on the R2+ clock, and signal 805 represents the captured bits in sampling latch 602B, which samples on the R2− clock. As shown, the even bits are captured in sampling latch 602A on the rising edge of signal 803, and the odd bits are captured in sampling latch 602B on the falling edge of signal 803, i.e., the odd bits are captured 180 degrees out of phase of the R2 signal from capture of the even bits.

Signal 806 represents an R4 clock signal generated by deserializer clock generator 607. Signal 806 could represent the R4− signal (assuming sampling on the falling edge) or the R4+ signal (assuming sampling on the leading edge), it being understood that the complementary signal is 180 degrees out of phase. The R4 signal is half the frequency of the R2 signal and derived from it Signals 807-809 represent the contents of latches 603A, 603B and 603C, respectively. The first bit of each nibble (designated d0) is captured in latch 603A from the contents of latch 602A on the R4+ clock, and is clocked into latch 603D on the R4− clock, a half cycle later. The second and third bits (d1, d2) are captured in latches 603B, 603C from latches 602A, 602B, respectively, on the R4− clock, i.e., half a cycle of the R4 clock after the d0 bit is clocked into latch 603A, (a full cycle of the R2 clock later).

On the next R4+ clock, bits d0, d1 and d2 are available from latches 603D, 603B and 603C, respectively. Bit d3 is directly available from latch 602B. All four bits are then clocked into register 604, the entire nibble now being available as a parallel output of register 604. Signal 812 represents the contents of register 604.

The R4 clock is provided to FIFO deskew buffer 605, if present. FIFO deskew buffer preferably contains eight primary delay registers 701 clocked on the R4− clock, each of which is selected in turn. Once clocked in, the data remains in the primary delay register 701 for eight cycles of the R4 clock, amounting to 32 bit times (the time it takes to transmit 32 serial bits across the link). Although the data remains in each of the primary delay register 701 and the secondary delay register 702 a respective fixed length of time, it can be output to the FIFO deskew output register 606 from the corresponding secondary register 702 any time during which it is in that register. Signal 811 represents the contents of the primary delay register 701, and signal 812 represents the contents of secondary delay register 702 (delayed one-half cycle of the R4 clock) from the primary delay register.

Output register 606 clocks data in on the receiver host clock signal, represented as signal 813. Data in the output register is represented as signal 814. Although a particular delay from the primary delay register 701 is illustrated, this delay is in fact variable, and could be longer or shorter. For example, in the illustration of FIG. 8, bits d0 . . . d3 were in fact available for clocking into register 606 one cycle of the host clock sooner, the delay being added in this example to align these bits with the outputs of other receiver synchronization circuits. Bits d0 . . . d2 alternatively could have been clocked into register 606 in any of the six host clock cycles after the one illustrated in the example. Thus, the data in the deskew output register is aligned with respect to data received on other lines as a result of the variable delay in FIFO deskew buffer 605, and is synchronized to the receiver host clock signal.

A receiver circuit 503 having certain components and specific adjustable parameters and timing characteristics has been described herein and illustrated in FIGS. 5, 6, 7 and 8 as a preferred embodiment. However, it should be understood that a receiver circuit can be any combination of circuits which receives an input signal over a line 402 (which may have an arbitrary skew within some permissible design range), and produces data synchronized to that of the other receiver circuits of the other lines. Many variations are possible in implementing a receiver circuit. In the preferred embodiment described herein, a relatively simple circuit has been employed to minimize power consumption. However, additional circuit elements could be present to compensate for increased data skew, noise, signal attenuation, and so forth. Additionally, some circuit elements shown and described herein may not be present, some elements may be combined, and different adjustable parameters may be used. By way of illustration of certain variations and not limitation, the number of sampling latches may vary; there may or may not be different latches or latch pairs for even/odd data; there may or may not be alternate latches for the same data and a selection mechanism for selecting the output of one; one or more offset amplifiers may be present, the number and arrangement of input amplifiers may be different and use different elements, a peaking adjustment such as provided by continuous time linear equalization (CTLE) filter may or may not be present, and might be combined with other elements; the number of delay registers in a FIFO deskew buffer may vary or might not be present at all; different mechanisms may be chosen for introducing delay for purposes of aligning data; the number and phase of clock cycles for performing various functions may vary; and so forth.

As one particular variation, although descrambler 504 is shown in the preferred embodiment as a form of data transformation device for ensuring transition density of the transmitted data, and in particular an exclusive-OR circuit, an alternate form of data transformation device for ensuring transition density, or no such data transformation device, may be present. An alternate form of data transformation device for ensuring transition density may be, for example, a decoder which restores encoded data to its original form from an encoding (e.g., according to an 8/10 bit encoding) which expands the number of bits is a stream of data to ensure that logical transitions occur with some minimum frequency, it being understood that in such case a complementary encoder would be present in the transmitter in place of a scrambler. The descrambler or other data transformation device for ensuring transition density is intended to spread out the spectral content of the signal and avoid long sequences of zeroes or ones being transmitted. If there is sufficient degradation of the receiver or drift in the phase of transmitted data with respect to the receiver clocks, this could cause data to become unreliable. However, if the receiver circuits are calibrated with sufficient frequency, then it may be possible to detect and correct any such tendency before data is corrupted, and in such case, and possibly others, scrambling or other transformation of data to ensure transition density would be unnecessary. Removal of the scrambler and descrambler may reduce power consumption. In such a case, a calibration pattern such as a PRBS pattern could be provided as an additional input to selector 501, for use only during calibration, and could be compared by using an exclusive-OR circuit in place of OR circuit 508. As another variation, a descrambler or other data transformation device need not be located as shown within receiver synchronization circuit 404, and may be alternatively located upstream of the FIFO deskew buffer or downstream of receiver buffer 507 (since the output of the FIFO deskew buffer is synchronized in the receiver host clock domain, although the data is not yet descrambled).

As another particular variation, a deserializer may not be present or may be present downstream of the deskewing latches, so that individual bits are propagated through the deskewing latches instead of multiple bits in parallel.

Calibration of the Receiver

In the preferred embodiments, one or more coefficients governing the operation of the receiver interface are calibrated and stored in calibration logic and control 409. The calibrated coefficient(s) include in particular a phase adjustment coefficient which determines the phase adjustment applied by phase rotator 509 to the clock signal which is distributed to the various receivers. In one exemplary embodiment, the phase adjustment coefficient is the only calibrated coefficient. In another exemplary embodiment, calibrated coefficients further include a respective gain coefficient for the respective variable gain amplifier 601 corresponding to each line 402. Calibrated coefficients could include other or alternative values.

Figure 9:
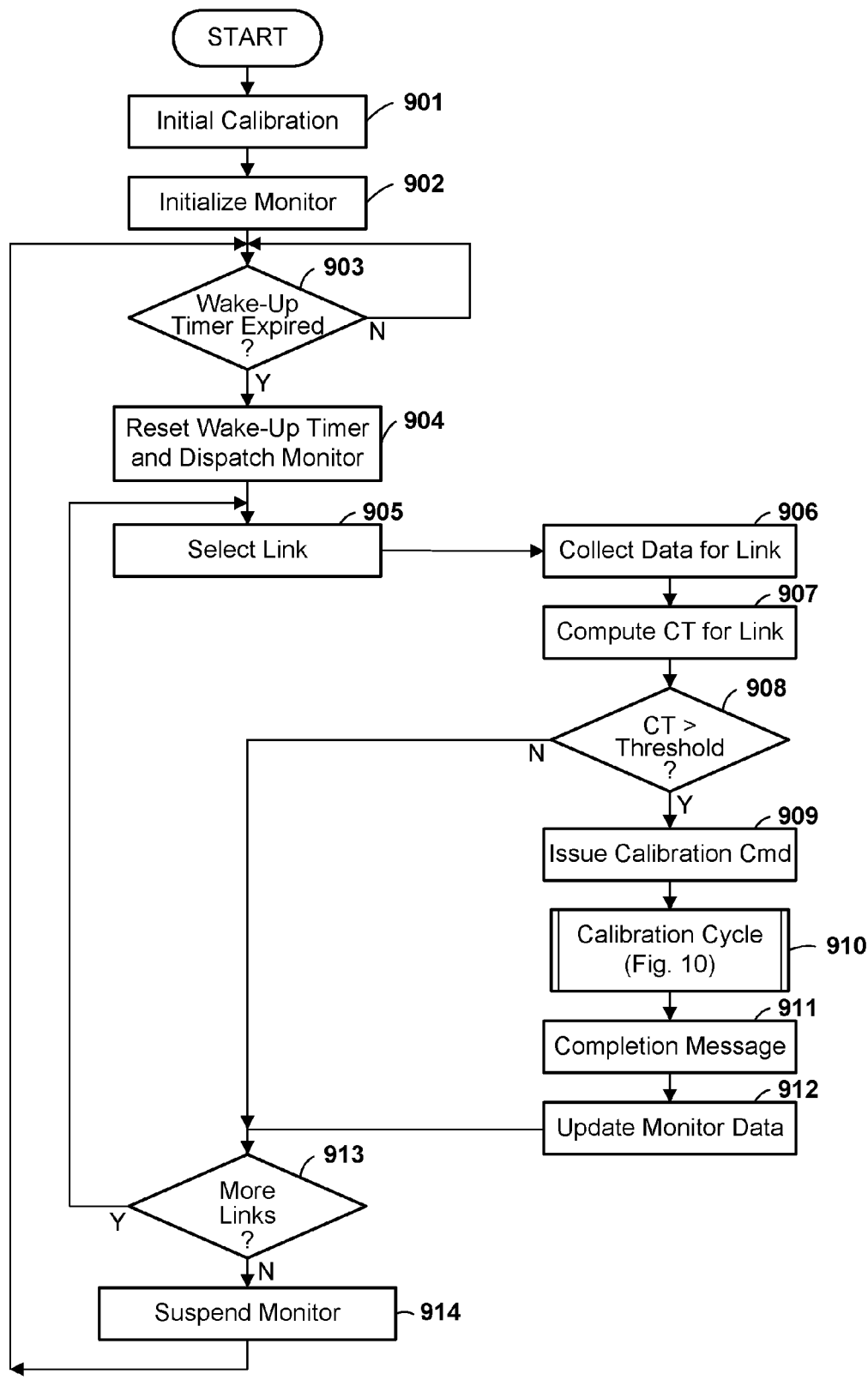
FIG. 9 is a flow diagram showing at a high level a process of monitoring and calibrating one or more point-to-point links of parallel lines, according to the preferred embodiment.

Calibration is performed at initial power-on of the digital device, and as needed thereafter. Because calibration, according to the preferred embodiments, entails temporary suspension of transmission of data across the communications link, it is desirable to calibrate no more often than necessary. Conventional schemes which calibrate on a fixed schedule or initiate a new calibration cycle as soon as a previous cycle has completed may calibrate much more often than minimally necessary to maintain the interface. In accordance with the preferred embodiment, calibration is triggered responsive to at least one parameter expressing a current state of the system and indicating a probable need for recalibration. I.e., this at least one parameter is something other than mere passage of time since the previous calibration cycle. The "current state of the system" need not be limited to state data maintained on the system, and could include environmental characteristics such as temperature of some component (although, at some point, even such environmental characteristics are reduced to data recorded in the system). Preferably, an intelligent interface monitor process 304 executing on a CPU of system 100 determines whether to initiate a calibration cycle based on multiple factors. FIG. 9 is a flow diagram showing at a high level a process of monitoring and calibrating one or more point-to-point links of parallel lines, according to a preferred embodiment of one or more aspects.

Referring to FIG. 9, upon power up, each of one or more link interfaces goes through an initial calibration cycle in which a respective initial value of phase rotation generated by the respective phase rotator in each bidirectional half of a link is calibrated, and any optional or additional calibrated amounts (e.g., a respective gain coefficient for each line or a number of delay cycles in a FIFO deskew buffer) are determined (block 901). The initial calibration cycle is triggered automatically in the calibration logic 407 and 409 upon power up, without need of an external command from a higher level monitoring process. This initial calibration is necessary to be able to load data into memory and processor caches. Sometime thereafter but as part of system initialization, a monitoring process for one or more point-to-point links is initiated (block 902). There could be a single monitoring process for multiple links, or a separate process for each link.

The monitoring process then waits for a wake-up timer to expire, represented as the tight loop at block 903. The monitoring process may be placed on a wait queue or other appropriate mechanism for active processes in the system which are awaiting some event, such as completion of a page load, expiration of a timer, or other event. The wake-up timer causes the monitoring process to be taken off the wait queue and placed in an appropriate queue for dispatch. Upon wake-up (the 'Y' branch from block 903), the wake-up timer is reset, and the monitoring process is dispatched to a CPU for execution by dispatcher 302 (block 904).

The monitoring process then selects a link (block 905), and obtains current data for the link (block 906). This preferably may include a count of data transmission errors detected (errorcount), the sampling interval preferably being reset each time the monitoring process is awakened.

Calibration is selectively triggered based on an indication of probable need. Furthermore, the monitoring process may consider one or more measures of current activity level of at least one system component (in other words, how busy the system or some part thereof is), so that calibration occurs during time periods when the system is not extremely busy. A monitoring process, executing as a low-level software process on a CPU 101 of the system, may take into account a variety of different parameters to make a selective calibration determination.

In an exemplary embodiment, monitoring process computes a respective figure of merit called a calibration trigger value (CT) for each parallel link to be calibrated (block 907). Preferably, both unidirectional halves of the same link are calibrated at the same time, although it would alternatively be possible to calibrate them at independent times. The CT can be computed separately for each unidirectional half, and calibration triggered if either CT exceeds a threshold. Alternatively, a single combined CT value for the link could be computed.

An exemplary CT value (for a unidirectional half of the interface) could be computed as:

$CT=K1*(POSITIVE(TempCURRENT-TempNOM))$ $+K2*|TempCURRENT-TempCAL-1|$ $+K3*errorcount/\Delta t$ $+K4*(tCURRENT-tCAL-1)|\Delta phase|/(tCAL-1-tCAL-2)$ $+K5*(POSITIVE(CPUAct-CPUActNOM))$, where K1 through K5 are appropriate weighting coefficients. The K1 term takes into account abnormally high operating temperature, i.e. the amount by which current temperature (TempCURRENT) exceeds some nominal temperature (TempNOM). The POSITIVE operator outputs the input value if the input value is positive; otherwise it outputs zero. The K2 term takes into account temperature drift since the last calibration cycle, and increases the CT score where temperature is changing. In this term, TempCURRENT represents the current temperature and TempCAL-1 represents the temperature at the time of last calibration. The K3 term takes into account the recent error rate in the interface, i.e., errorcount is a count of errors in transmitted data recorded during a recent sampling interval of time (Δt). The K4 term takes into account the most recently observed drift in calibrated value of the phase rotator. In the K4 expression, |Δphase| represents the absolute value of the phase adjustment made during the last calibration cycle, and tCURRENT, tCAL-1, and tCAL-2 represent respectively the current time, the time of the last calibration cycle, and the time of the next to last calibration cycle. The K5 term takes into account how busy system currently is, which is preferably measured as a CPU activity level (CPUAct) during a recent sampling interval. CPU activity level is a number between 0 and 1, expressing a proportion of CPU capacity utilization. As is known in the art, such a number is typically an estimate based on a heuristic, which can be obtained in any of various ways. Preferably, mechanisms for producing a CPU activity level are present in the system, and the interface monitor simply uses the existing mechanisms and the data they produce. Other measures of activity, such as number of cache load/store operations, might alternatively be used. CPUAct represents a measured CPU activity level, and CPUActNOM represents a nominal value. Unlike coefficients K1 through K4, the K5 coefficient would typically be negative, so that an actual CPU activity level in excess of some nominal value would reduce the calibration trigger value.

The CT value is then compared with a pre-determined threshold (block 908). If the CT exceeds the threshold, the monitoring process triggers a calibration cycle for the link under consideration by issuing a calibration command to the interface (block 909). For this purpose, the link interface can be treated as an I/O device, having a device identifier to which it responds. The calibration and control circuitry 407, 409 within the interface receives the calibration command, an responsive thereto calibrates the interface. This calibration is represented in FIG. 9 as block 910, and described in greater detail herein with respect to FIG. 10.

In one variation of the embodiments described herein, the monitoring process could trigger any of multiple different types of calibration, the command being issued at block 909 indicating the type of calibration to be performed. In particular, there could be a relatively high priority, non-interruptible calibration, and a relatively low priority, interruptible calibration, the type of calibration chosen being dependent in the CT value or some other indicator. The high-priority calibration would immediately suspend transmission of data across the link being calibrated, and continue to suspend such data transmission until completion of calibration. The low priority calibration would allow the link to first empty any buffers on the transmission side, and to suspend calibration activities from time to time during calibration in order to empty the buffers again. The higher priority non-interruptible calibration would require a higher CT value or, for example, an abnormally high error rate (the K3 term in the CT value equation), indicating that the interface may be operating at the edge of its acceptable range.

During calibration, the monitoring process waits. Upon completion of calibration, the calibration and control circuitry 407, 409 returns a completion message to the monitor (block 911). This completion message preferably includes the calibrated value(s) of the phase rotator(s). The monitoring process then updates certain interface monitor data 305 (e.g., the calibrated value(s) of the phase rotator(s), time of calibration, current temperature, etc.) for use in computing future CT values (block 912).

If there are any more links to consider calibrating, the 'Y' branch is taken from block 913, and a next link is selected at block 904. When all links have been considered, the 'N' branch is taken from block 913, and the monitor process suspends execution and returns to the wait queue (block 914).

Responsive to a calibration command received from the interface monitor, calibration logic 407, 409 within the interface calibrates the calibratable components of the link, specifically phase rotator 509. Calibration involves some coordination of functions performed in the transmitter and receiver. Preferably, control information for coordinating these activities is exchanged on the same lines 420 which are used for data transmission. This is accomplished by transmitting commands, status information, and other control data as data packets over the link, and recognizing this control data as such from information in the packet header. These procedures are described in greater detail below, with reference to FIG. 10.

Figure 10A:
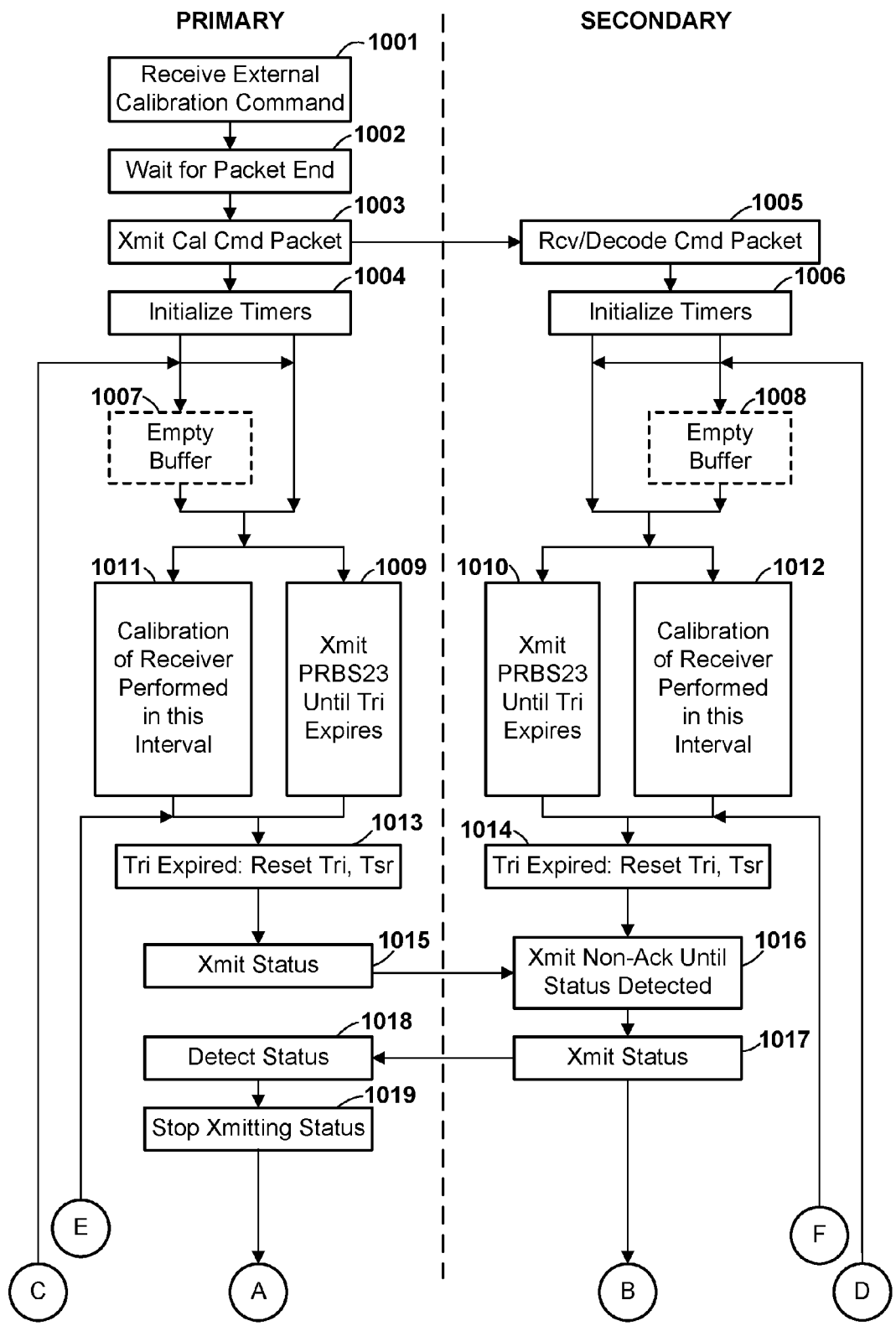
FIGS. 10A and 10B (herein collectively referred to as FIG. 10) are a flow diagram showing a process of exchanging control information and time multiplexing of function for calibrating both halves of a parallel link, according to the preferred embodiment
Figure 10B:
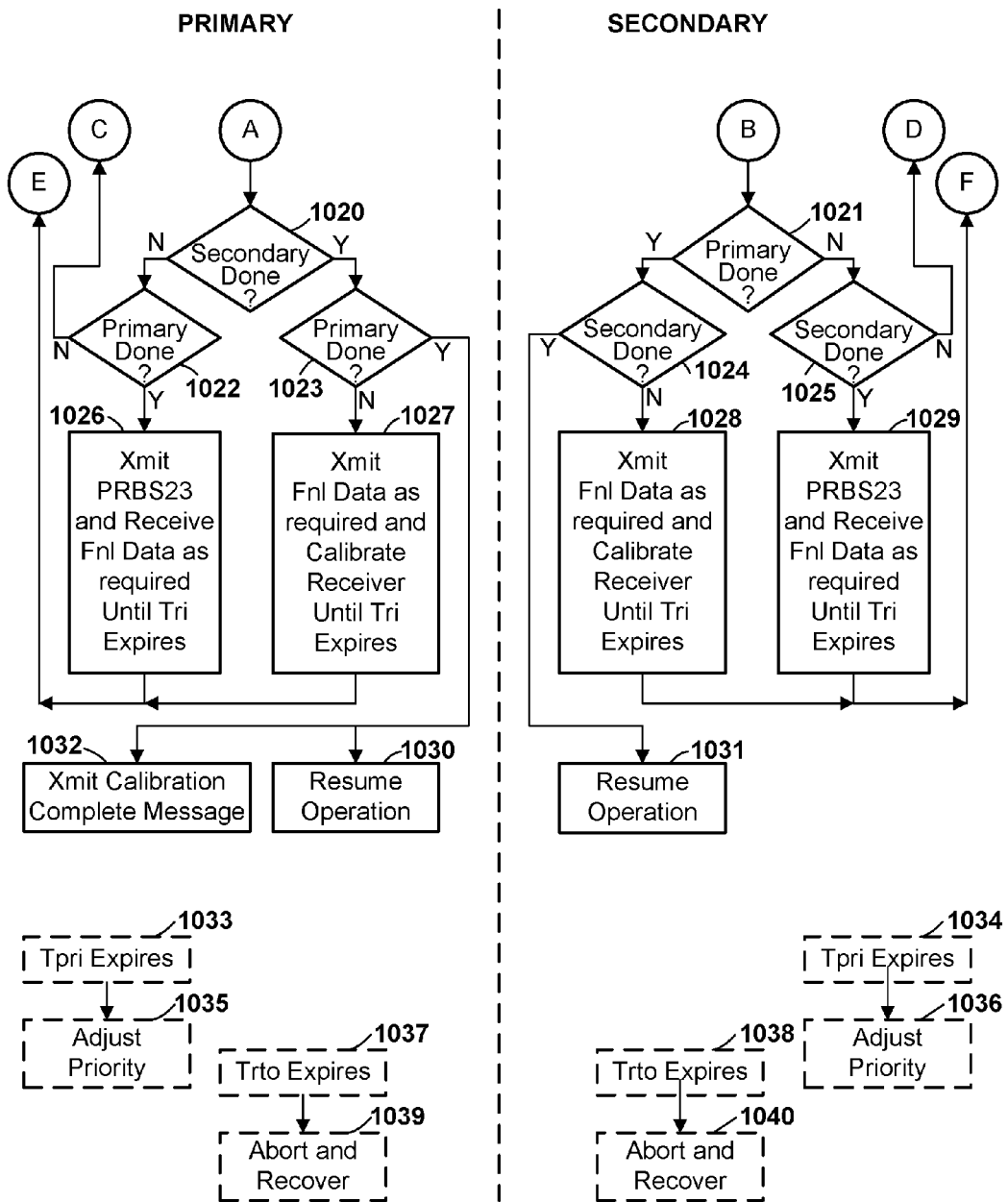

FIGS. 10A and 10B (herein collectively referred to as FIG. 10) are a flow diagram showing a process of exchanging control information and time multiplexing of function for calibrating both halves of a parallel link 201 of multiple lines, the two halves conveying data in opposite directions, according to the preferred embodiment. I.e., FIG. 10 illustrates in greater detail the exchange of control information and time multiplexing of function involved in performing block 910 of FIG. 9.

Referring to FIG. 10, one of the two devices coupled by the link is designated the "primary", while the other is designated the "secondary". The calibration logic and control circuits in the primary device communicate externally with the interface monitor, and initiate a calibration cycle responsive to an external command from the interface monitor. The primary device communicates the calibration to the secondary device, which responds to the primary. Actions performed by the primary are illustrated on the left side of the central division line in FIG. 10, while actions performed by the secondary are illustrated on the right side.

A calibration cycle is initiated when the primary device receives a calibration command through its external interface from the monitoring process, i.e. a command issued by the monitoring process and directed to an I/O device identifier corresponding to the primary device's link interface (block 1001). The primary device then waits for the end of any packet currently being transmitted (block 1002), and then halts the transmit buffer while inserting a calibration command packet in the data stream using switch 505 to select the command input (block 1003). At approximately the same time, the primary device initializes a set of timers, described below (block 1004).

The secondary device receives and decodes the calibration command packet (block 1005). It likewise initializes a set of timers (block 1006).

Calibration and exchange of control commands is preferably governed by four timers, which could use selectable values. A recalibration timeout (Trto), usually in the multiple-millisecond range, is used to abort calibration if one or both lines fail to properly calibrate in a reasonable time. A recalibration priority timeout (Tpri), somewhat shorter than Tpri, is used to change a low-priority calibration to a high priority, non-interruptible calibration where insufficient forward progress is being made, possibly because calibration is being interrupted too much by functional data. A recalibration interval (Tri), usually in the multiple-microsecond range, is used to define the length of time for sending the PRBS23 bit pattern and performing calibration operations at the receiver. A status reporting interval, Tsr, usually in the sub-microsecond range, is used to limit the interval within which status is reported. The timers in the primary and secondary are not necessarily synchronized to begin at precisely the same moment, but the nature of the protocol accommodates small discrepancies in the timers which inevitably result from the time required to propagate and detect a control command.

After transmitting the calibration command packet and initializing timers at blocks 1003, 1004, if the calibration command is for low priority interruptible calibration, the primary device then transmits any additional packets which might be waiting in transmit buffer 506, i.e. functional data packets (block 1007). The secondary device likewise transmits any additional packets which might be waiting in its transmit buffer (block 1008). In the case of a high priority, non-interruptible calibration, blocks 1007 and 1008 are skipped.

The primary repeatedly transmits the PRBS23 test pattern on each line by selecting a null input with switch 505 (block 1009), and the secondary repeatedly transmits the PRBS23 test pattern on each line in the opposite direction in the same manner (block 1010), until the expiration of the Tri timers in the primary and secondary. During this interval, both the primary and the secondary perform calibration actions as described above with respect to their respective receivers (blocks 1011 and 1012).

Upon expiration of the Tri timers, calibration actions are suspended in the primary and the secondary. The Tri and Tsr timers are reset in both the primary (block 1013) and the secondary (block 1014). The primary then repeatedly transmits its status (as an appropriate command packet) to the secondary (block 1015), while the secondary initially transmits a non-ack packet to the primary until the primary's status packet is detected (block 1016). When the secondary detects the primary's status packet, it then stops transmitting the non-ack packet, and transmits its own status as a single status (block 1017). The primary, upon detecting the secondary's status packet (block 1018), takes this as an acknowledgment from the secondary that the secondary has successfully detected the primary's status, and stops transmitting the status packet (block 1019).

The status information includes whether calibration is complete in the sending device. Upon completion of block 1019, both the primary and secondary should have each other's current state. (In the unlikely event the Tsr timers expire before the primary or secondary receives the other's status, the device which did not detect status simply assumes that the other has not finished calibration, and proceeds accordingly.) If neither the primary nor the secondary has finished recalibration (the 'N' branches from blocks 1020 and 1022, and the 'N' branches from blocks 1021 and 1025), then the primary and secondary return to blocks 1007 (optional), 1009, 1011, and 1008 (optional), 1010, 1012, respectively to again empty the buffers (as required), transmit the PRBS23 test pattern on the lines and resume calibration of the receiver, until Tri again expires.

If the primary has finished recalibration of its receiver but the secondary has not finished recalibrating its receiver (the 'N' branch from block 1020 and 'Y' branch from block 1022 in the primary, and the 'Y' branch from block 1021 and the 'N' branch from block 1024 in the secondary), then the primary transmits the PRBS23 pattern from its transmitter while operating its receiver normally with the newly calibrated parameters (block 1026). I.e., block 1026 represents an interval in which the primary can receive functional data from the secondary, but only transmits the PRBS23 pattern. The secondary meanwhile continues to calibrate its receiver, and, to the extent any functional data arrives in its transmitter buffer for transmission to the primary, it transmits it in the normal manner (block 1028). When the Tri timers expire, the primary and secondary return to blocks 1013, 1014 to reset the timers and again report status.

An analogous procedure is followed if the secondary has finished recalibration of its receiver, but the primary has not (the 'Y' branch from block 1020 and 'N' branch from block 1023 in the primary, and the 'N' branch from block 1021 and the 'Y' branch from block 1025 in the secondary). The secondary transmits the PRBS23 pattern from its transmitter while operating its receiver normally with the newly calibrated parameters, receiving any functional data transmitted by the primary (block 1029). The primary meanwhile continues to calibrate its receiver, and transmits any functional data arriving in its transmitter buffer (block 1027). When the Tri timers expire, the primary and secondary return to blocks 1013, 1014 to reset the timers and again report status.

If both the primary and the secondary have finished recalibration of their respective receivers (the 'Y' branches from blocks 1020 and 1023 in the primary, and the 'Y' branches from blocks 1021 and 1024 in the secondary), then the primary and secondary transmit resume normal functional operation with the newly calibrated parameters (blocks 1030, 1031). Additionally, the primary sends a calibration complete message to the interface monitor process (block 1032). The calibration complete message includes the calibrated parameters from both the primary and secondary device (the secondary having previously reported its calibration parameters in its final status packet).

Throughout the performance of blocks 1007 through 1029, the Tpri and Trto timers are running in the primary and secondary devices. If the Tpri timers timeout (represented as blocks 1033, 1034, the priority of the calibration is set to "high priority non-interruptible" (blocks 1035, 1036) in order to attempt to finish calibration before timeout of the Trto timers.

If the Trto timers timeout (represented as blocks 1037, 1038), further calibration processing is immediately aborted, and appropriate recovery actions are taken (represented as blocks 1039, 1040). The Trto timers thus prevent calibration from continuing indefinitely, where more than adequate time for performing calibration has already elapsed. The recovery actions would depend on the circumstances. If a single line can not be calibrated and an optional spare line is available, the single line can be deactivated and the spare used in its place (as described in U.S. Pat. No. 8,767,531 to Ferraiolo et al., and U.S. Pat. No. 8,898,504 to Baumgartner et al., both of which are herein incorporated by reference). Some problems may require suspension of functional data transmission and/or re-initialization of the entire link, but it is expected that this will only rarely occur.

In the preferred embodiment, calibration is accomplished by transmitting the known PRBS23 test pattern on one or more lines 402, and iteratively adjusting one ore more calibration parameters and observing the effect of such adjustments at the output of the descrambler circuit. I.e., a PRBS23 pattern, if correctly received and decoded, will be descrambled to a string of zeroes, so that any '1' in the string indicates an error.

In particular, in the preferred embodiment, the phase of phase rotator 509 is calibrated by incrementally adjusting the phase and observing the effect on the output. For a pseudo-random bit pattern having an equal number of '1's and '0's, half of the transmitted bits in a bit stream involve bit transitions. If the clock phase is exactly on the boundary between cycle transitions, it would be expected that 50% of the bits which involve bit transitions will be interpreted correctly by the receiver, and 50% will be errors. However, if the bit does not transition, then 100% should be interpreted correctly. Therefore, at the phase boundary, the error rate is expected to be 25%. The phase rotator is advanced until a 25% error rate is observed to identify the boundary, and then retarded exactly half the length of the data bit from that point.

Where optional additional calibratable hardware, such as optional variable gain amplifier 601 is present, that hardware is similarly calibrated by iteratively adjusting the parameter and observing the effect on the circuit output. Where a particular calibratable component is used for a single line only (as in the case of optional variable gain amplifier 601), only one line's circuit will be calibrated at a time.

Although a relatively simple receiver is described herein as a preferred embodiment for use in a chip-to-chip link where the chips are mounted on a common silicon carrier 202 or common chip stack 204, it will be appreciated that more complex circuitry might be used, particularly where the link traverses a fiberglass substrate printed circuit card or multiple cards. The number of calibratable components and calibration coefficients may be much larger, requiring a significantly more complex calibration procedure. Furthermore, while in the preferred embodiment the transmission of functional data is suspended during calibration, more complex circuitry might be used to support concurrent calibration and transmission of functional data. For example, one or more additional lines supported by multiplexer switches may be present, allowing calibration to be performed in a round robin manner on each line while concurrently transmitting functional data. Exemplary complex receiver circuits and procedures for calibrating the same while concurrently transmitting functional data are disclosed in each of the following U.S. Patents or U.S. Patent Publications, each of which is herein incorporated by reference: U.S. Pat. No. 8,681,839 to Bulzacchelli et al.; U.S. Patent Publication 2012/0106539 to Ferraiolo et al.; U.S. Pat. No. 8,767,531 to Ferraiolo et al.; and U.S. Pat. No. 8,898,504 to Baumgartner et al.

In the calibration procedures described herein and in the above referenced patent applications, all data input to the calibration circuit is data that has passed through the receiver circuits and is output by it. No special analog sensing circuitry is required for providing input to the calibration circuit. However, such a calibration procedure is not necessarily the only method by which a receiver interface could be calibrated using only the output data or could be calibrated consistent with the present invention. As previously explained, different circuit elements may be present in a receiver synchronization circuit, which may require different calibration procedures as appropriate. Special purpose analog circuitry may exist for measuring incoming voltage levels and so forth to support calibration. Furthermore, even for the circuit elements of the preferred embodiment, the calibration procedures described herein and the parameters used are not necessarily the exclusive means of calibrating the disclosed circuit elements.

Design Structure

Figure 11:
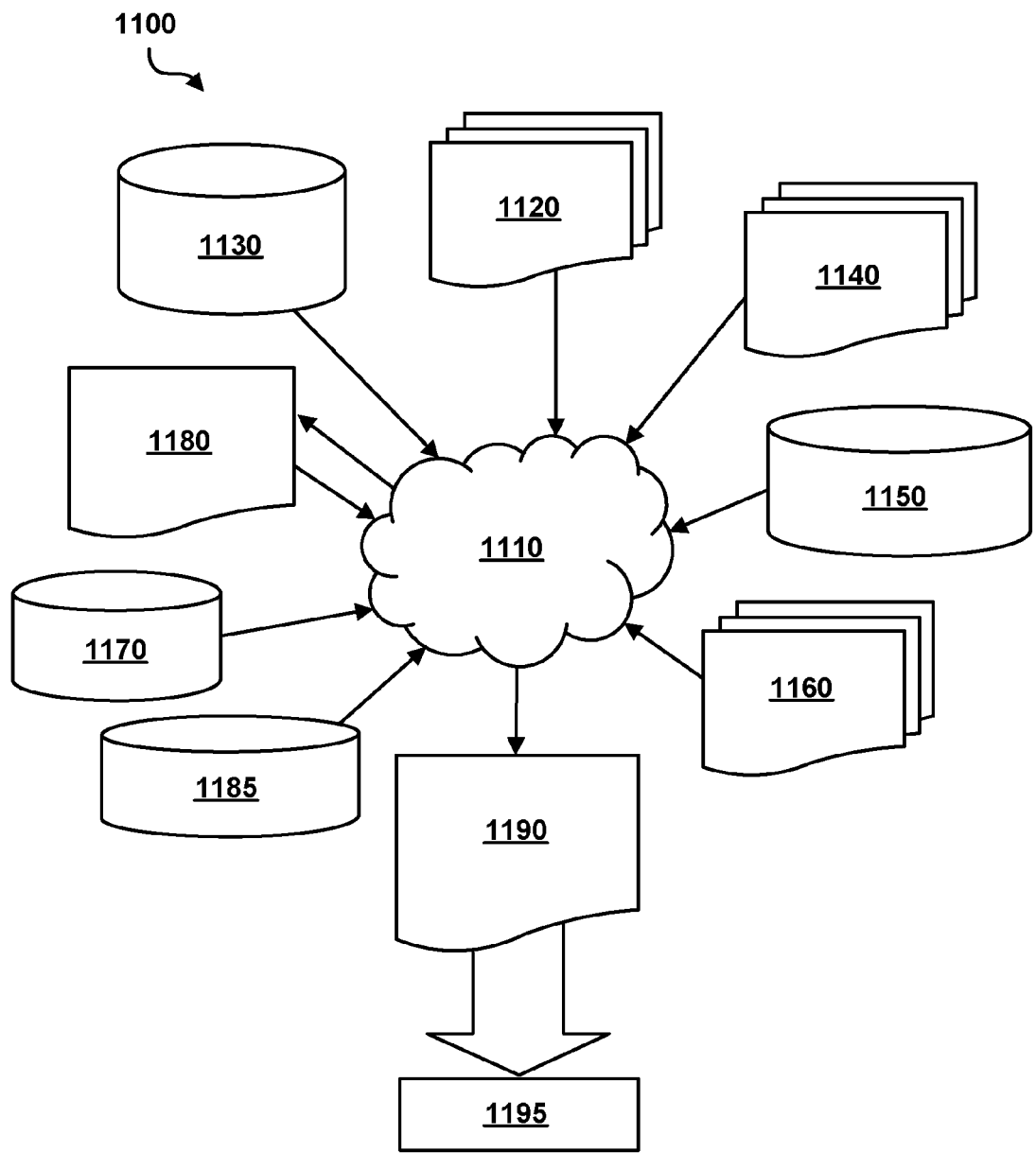
FIG. 11 is a flow diagram of a design process used in semiconductor design, manufacture and/or test.

FIG. 11 shows a block diagram of an exemplary design flow 1100 used for example, in semiconductor design, manufacturing, and/or test. Design flow 1100 may vary depending on the type of IC being designed. For example, a design flow 1100 for building an application specific IC (ASIC) may differ from a design flow 1100 for designing a standard component. Design structure 1120 is preferably an input to a design process 1110 and may come from an IP provider, a core developer, or other design company or may be generated by the operator of the design flow, or from other sources. Design structure 1120 comprises an embodiment of any aspect of the invention as shown in any of FIGS. 1-10 in the form of schematics or HDL, a hardware-description language (e.g., Verilog, VHDL, C, etc.). Design structure 1120 may be contained on one or more machine readable medium. For example, design structure 1120 may be a text file or a graphical representation of an embodiment of any aspect of the invention as shown in any of FIGS. 1-10. Design process 1110 preferably synthesizes (or translates) an embodiment of any aspect of the invention as shown in any of FIGS. 1-10 into a netlist 1180, where netlist 1180 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 1180 is resynthesized one or more times depending on design specifications and parameters for the circuit.

Design process 1110 may include using a variety of inputs; for example, inputs from library elements 1130 which may house a set of commonly used elements, circuits, and devices, including models, layouts, and symbolic representations, for a given manufacturing technology (e.g., different technology nodes, 32 nm, 45 nm, 90 nm, etc.), design specifications 1140, characterization data 1150, verification data 1160, design rules 1170, and test data files 1185 (which may include test patterns and other testing information). Design process 1110 may further include, for example, standard circuit design processes such as timing analysis, verification, design rule checking, place and route operations, etc. One of ordinary skill in the art of integrated circuit design can appreciate the extent of possible electronic design automation tools and applications used in design process 1110 without deviating from the scope and spirit of the invention. The design structure of the invention is not limited to any specific design flow.

Design process 1110 preferably translates an embodiment of any aspect of the invention as shown in any of FIGS. 1-10, along with any additional integrated circuit design or data (if applicable), into a second design structure 1190. Design structure 1190 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 1190 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of any aspect of the invention as shown in any of FIGS. 1-10. Design structure 1190 may then proceed to a stage 1195 where, for example, design structure 1190: proceeds to tape-out, is released to manufacturing, is released to a mask house, is sent to another design house, is sent back to the customer, etc.

Other Variations

In the preferred embodiment described above, all calibration adjustments, and particularly the adjustment of the common clock phase, are performed within the receiver. Adjusting the receiver circuitry to accommodate transmission variations is preferred, because calibration logic which analyzes the outputs of the receiver circuits is located in the same device. However, it will be appreciated that variations in the transmitted signals could alternatively be compensated in whole or in part by adjustments performed in the transmitter circuits. In particular, it would be possible to individually adjust a common clock for each transmitter circuit so that the outputs produced by the receiver circuits are properly synchronized. It is possible that other parameters, such as a variable gain or an offset, might also be adjusted within the transmitter.

In the preferred embodiment described above, a bidirectional parallel data link contains separate unidirectional portions each of which are recalibrated at the same time. This approach has the advantage of simplifying the calibration control and confining disruption of the interface. However, it would alternatively be possible to independently trigger calibration for each unidirectional portion of the link, so that recalibration does not necessarily occur at the same time. Additionally, while it is preferred that a point-to-point link be bidirectional, the link could alternatively be unidirectional, i.e. a unidirectional set of lines 401 as shown in FIG. 4 could exist independently, without any lines for transmitting data in the opposite direction. In this case, there should be alternative means for transmitting control signals in the opposite direction for purposes of coordinating calibration actions described above.

Although a specific sequence of operations is illustrated in the flow diagrams and described in the accompanying text, it will be appreciated that some operations could be performed in a different order, that some operations need not be performed, and that other operations may be performed instead, consistent with the present invention.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 1 as system memory 102 and data storage devices 122.

Unless inconsistent with the invention or otherwise qualified herein, computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Although a specific embodiment of the invention has been disclosed along with certain alternatives, it will be recognized by those skilled in the art that additional variations in form and detail may be made within the scope of the following claims.

What is claimed is:

1. A communications mechanism for communicating between digital data devices, comprising: a first plurality of parallel lines supporting a parallel communications link for communicating data in a first direction from a first digital data device to a second digital data device; a calibration mechanism for recalibrating said parallel communications link at each of a plurality of discrete times each separated by a respective time interval, the parallel communications link being operable to transmit functional data during at least part of the time intervals separating the plurality of discrete times; and a control mechanism coupled to said calibration mechanism which determines the discrete times at which said calibration mechanism recalibrates said parallel communications link, said discrete times being determined responsive to at least one current state parameter indicating a current need for recalibration, said at least one current state parameter being other than a predetermined schedule.

2. The communications mechanism of claim 1, wherein said control mechanism comprises a software process embodied as instructions executable on a programmable processor and storable in addressable main memory of a computer system.

3. The communications mechanism of claim 2, wherein said software process computes a figure of merit using the at least one current state parameter indicating a current need for recalibration and at least one current state parameter indicating a current level of activity of at least one component of said computer system, and determines whether to initiate recalibration of said parallel communications link based on said figure of merit.

4. The communications mechanism of claim 1, wherein said calibration mechanism suspends transmission of functional data on said parallel communications link while performing at least one calibration operation.

5. The communications mechanism of claim 1, wherein said at least one parameter other than a predetermined schedule comprises at least one of: a temperature, a change in temperature, a rate of transmission errors in communicated data, and a rate of change in a calibrated value.

6. The communications mechanism of claim 1, wherein said first plurality of parallel lines are coupled to respective receiver circuits sharing a phase-adjustable common clock domain, the phase of the common clock being recalibrated by said calibration mechanism.

7. The communications mechanism of claim 1, further comprising: a second plurality of parallel lines supporting a parallel communications link for communicating data in a second direction from said second digital data device to said first digital data device; wherein said calibration mechanism is further for recalibrating said parallel communications link for communicating data in the second direction at each of said plurality of discrete times separated by a respective time interval.

8. The communications mechanism of claim 1, wherein said first digital data device and said second digital data device are integrated circuit chips which are at least one of: (a) mounted on a common silicon carrier, or (b) mounted adjacent one another in a common chip stack of a 3D stacked configuration.

9. The communications mechanism of claim 1, wherein, in at least one operating mode, the calibration mechanism selectively interrupts recalibration of at least one line of said first plurality of parallel lines of said parallel communications link to transmit functional data on the at least one line and resumes recalibration at the conclusion of transmitting the functional data.

10. A digital data processing apparatus, comprising: a plurality of integrated circuit chips, said integrated circuit chips embodying at least an addressable main memory and at least one at least one programmable processor executing instructions storable in said addressable main memory; at least one parallel communications link, each said parallel communications link for communicating data between a respective pair of said plurality of integrated circuit chips, each said at least one parallel communications link having a respective plurality of parallel lines supporting data communication in a first direction from a first chip of the respective pair to a second chip of the respective pair; a respective calibration mechanism corresponding to each said parallel communications link for recalibrating the respective parallel communications link responsive to a respective externally generated command to recalibrate the respective parallel communications link, wherein recalibrating the respective parallel communications link comprises completing calibration of the respective parallel communications link to place the respective parallel communications link in a calibrated state; a control program embodied as instructions executable on said at least one programmable processor and storable in said addressable main memory, said control program executing at least one software process which determines need for recalibration of said at least one parallel communications link based on at least one parameter other than a pre-determined schedule, and responsive to determining a need for recalibration of a link of said at least one parallel communications link, generates the respective externally generated command to the respective calibration mechanism to cause the respective calibration mechanism to recalibrate the link determined to have a need for recalibration.

11. The digital data processing apparatus of claim 10, wherein functional data is transmitted on each parallel communications link during each of a plurality of respective time intervals separating a respective plurality of discrete times at which the corresponding calibration mechanism recalibrates the respective parallel communications link, and wherein each said calibration mechanism suspends transmission of functional data on the corresponding parallel communications link while performing at least one calibration operation.

12. The digital data processing apparatus of claim 10, wherein said at least one parameter other than a pre-determined schedule comprises at least one of: a temperature, a change in temperature, a rate of transmission errors in communicated data, and a rate of change in a calibrated value.

13. The digital data processing apparatus of claim 10, wherein each said respective plurality of parallel lines is coupled to respective receiver circuits sharing a respective phase-adjustable common clock domain, the phase of the common clock being recalibrated by the corresponding calibration mechanism.

14. The digital data processing apparatus of claim 10, wherein said control program generates a plurality of different types of externally generated commands to each said calibration mechanism, including a first type directing the calibration mechanism to recalibrate the corresponding communications link without interruption, and a second type directing the calibration mechanism to recalibrate the corresponding communications link and interrupt recalibration as necessary to transmit functional data.

15. A method for operating a digital parallel communications link, comprising: communicating functional data in a first direction from a first digital data device to a second digital data device on a plurality of parallel lines of said parallel communications link; determining that the communications link should be recalibrated at each of a plurality of discrete times separated by a respective time interval, said plurality of discrete times being determined responsive to at least one current state parameter indicating a current need for recalibration, said at least one current state parameter being other than a predetermined schedule; responsive to determining at each respective discrete time that the communications link should be recalibrated, recalibrating the communications link to place the communications link in a calibrated state; wherein each of a plurality of lines of the parallel communications link is operable to transmit functional data during at least part of the time intervals separating the plurality of discrete times.

* * * * *